US011640106B2

(12) United States Patent
Takano et al.

(10) Patent No.: US 11,640,106 B2
(45) Date of Patent: May 2, 2023

(54) LIGHT SOURCE OPTICAL SYSTEM, LIGHT SOURCE DEVICE, AND IMAGE PROJECTION APPARATUS

(71) Applicants: Yohei Takano, Kanagawa (JP); Naoki Nakamura, Saitama (JP)

(72) Inventors: Yohei Takano, Kanagawa (JP); Naoki Nakamura, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 68 days.

(21) Appl. No.: 17/287,523

(22) PCT Filed: Oct. 7, 2019

(86) PCT No.: PCT/JP2019/039440
§ 371 (c)(1),
(2) Date: Apr. 22, 2021

(87) PCT Pub. No.: WO2020/110464
PCT Pub. Date: Jun. 4, 2020

(65) Prior Publication Data
US 2021/0389652 A1 Dec. 16, 2021

(30) Foreign Application Priority Data
Nov. 29, 2018 (JP) .............................. JP2018-223215

(51) Int. Cl.
*G03B 21/20* (2006.01)
*G02B 9/06* (2006.01)
(Continued)

(52) U.S. Cl.
CPC ......... *G03B 21/204* (2013.01); *G02B 5/3083* (2013.01); *G02B 9/06* (2013.01);
(Continued)

(58) Field of Classification Search
CPC .................. G03B 21/204; G03B 21/2073; G03B 21/208; G02B 9/06; G02B 13/16;
(Continued)

(56) References Cited

U.S. PATENT DOCUMENTS

2011/0110216 A1    5/2011  Kimura et al.
2012/0249972 A1   10/2012  Kurosaki
(Continued)

FOREIGN PATENT DOCUMENTS

CN    102375315 A    3/2012
CN    104603689 A    5/2015
(Continued)

OTHER PUBLICATIONS

Chinese Office Action dated Dec. 28, 2021, in corresponding Chinese Patent Application No. 201980078272.4.
(Continued)

*Primary Examiner* — Magda Cruz
(74) *Attorney, Agent, or Firm* — Xsensus LLP

(57) ABSTRACT

A light source optical system used with an excitation light source configured to emit first color light includes a wavelength conversion unit configured to receive the first color light emitted by the excitation light source and emit second color light with a wavelength different from a wavelength of the first color light, There is a first optical system having a positive power and a second optical system having a positive power provided in this order in an optical path between the excitation light source and the wavelength conversion unit. When a ray parallel to an optical axis of the first optical system is incident on the first optical system, a ray emitted from the first optical system is incident on the second optical system while approaching the optical axis. The second optical system has under-corrected spherical aberration at a paraxial focal position of the second optical system.

20 Claims, 31 Drawing Sheets

(51) Int. Cl.
*G02B 13/16* (2006.01)
*G02B 13/18* (2006.01)
*G02B 19/00* (2006.01)
*G02B 26/00* (2006.01)
*G02B 27/28* (2006.01)
*G02B 27/30* (2006.01)
*G02B 5/30* (2006.01)

(52) U.S. Cl.
CPC .......... *G02B 13/16* (2013.01); *G02B 13/18* (2013.01); *G02B 19/0057* (2013.01); *G02B 26/008* (2013.01); *G02B 27/283* (2013.01); *G02B 27/30* (2013.01); *G03B 21/2066* (2013.01); *G03B 21/2073* (2013.01)

(58) Field of Classification Search
CPC .. G02B 13/18; G02B 19/0057; G02B 26/008; G02B 27/283; G02B 27/30; G02B 27/09; H04N 9/3114; H04N 9/3167; H04N 9/3158; F21V 9/14; F21V 9/32
See application file for complete search history.

(56) References Cited

U.S. PATENT DOCUMENTS

| | | | |
|---|---|---|---|
| 2013/0343033 A1* | 12/2013 | Matsubara | H04N 5/74 362/19 |
| 2014/0268068 A1 | 9/2014 | Takahashi et al. | |
| 2014/0268072 A1 | 9/2014 | Takahashi et al. | |
| 2014/0268073 A1 | 9/2014 | Takano | |
| 2014/0340658 A1 | 11/2014 | Takano et al. | |
| 2015/0167932 A1 | 6/2015 | Yamada et al. | |
| 2015/0222864 A1 | 8/2015 | Inoko | |
| 2015/0370048 A1 | 12/2015 | Takano | |
| 2016/0062221 A1* | 3/2016 | Matsubara | G03B 21/204 353/31 |
| 2016/0091700 A1 | 3/2016 | Takano | |
| 2016/0103304 A1 | 4/2016 | Takano et al. | |
| 2016/0165194 A1 | 6/2016 | Hartwig et al. | |
| 2016/0241822 A1 | 8/2016 | Takagi et al. | |
| 2017/0059836 A1 | 3/2017 | Takano | |
| 2017/0059971 A1 | 3/2017 | Takano et al. | |
| 2017/0064268 A1 | 3/2017 | Shibayama et al. | |
| 2017/0090094 A1 | 3/2017 | Ohsugi et al. | |
| 2017/0192239 A1 | 7/2017 | Nakamura et al. | |
| 2017/0199450 A1* | 7/2017 | Matsubara | F21V 5/007 |
| 2018/0003934 A1 | 1/2018 | Takano et al. | |
| 2018/0074302 A1 | 3/2018 | Takano et al. | |
| 2018/0095353 A1 | 4/2018 | Ishikawa | |
| 2018/0239228 A1* | 8/2018 | Akiyama | G03B 21/204 |
| 2018/0314141 A1 | 11/2018 | Yamakage et al. | |
| 2018/0364555 A1 | 12/2018 | Nagase | |
| 2019/0219801 A1 | 7/2019 | Takano et al. | |
| 2020/0064719 A1 | 2/2020 | Nakamura et al. | |

FOREIGN PATENT DOCUMENTS

| | | | | |
|---|---|---|---|---|
| CN | 106773494 A | 5/2017 | | |
| CN | 107208856 A | 9/2017 | | |
| CN | 107515512 A | 12/2017 | | |
| CN | 108008593 A | 5/2018 | | |
| CN | 108533980 A | 9/2018 | | |
| CN | 108803222 A | 11/2018 | | |
| JP | 2012048832 A | * | 3/2012 | ............ G02B 3/00 |
| JP | 2013114980 A | * | 6/2013 | ............ G03B 21/14 |
| JP | 2015-138082 | 7/2015 | | |
| JP | 2016-071234 | 5/2016 | | |
| JP | 2016-170349 | 9/2016 | | |
| JP | 2017-032762 | 2/2017 | | |
| JP | 2015-194523 | 10/2017 | | |
| JP | 2019-139114 | 8/2019 | | |
| KR | 101840048 B1 | 3/2018 | | |
| WO | WO 2014/196015 A1 | 12/2014 | | |
| WO | WO 2017/128027 A1 | 7/2017 | | |
| WO | WO2018/168429 A1 | 9/2018 | | |

OTHER PUBLICATIONS

International Search Report dated Jan. 14, 2020 in PCT/JP2019/039440 filed on Oct. 7, 2019.
CS&E—Upload peer contribution by CNIPA on Dec. 20, 2019 in PCT/JP2019/039440 filed on Oct. 7, 2019.
CS&E—Upload peer contribution by EPO on Dec. 13, 2019 in PCT/JP2019/039440 filed on Oct. 7, 2019.
CS&E—Upload peer contribution by KIPO on Dec. 24, 2019 in PCT/JP2019/039440 filed on Oct. 7, 2019.
CS&E—Upload peer contribution by USPTO on Dec. 4, 2019 in PCT/JP2019/039440 filed on Oct. 7, 2019.

* cited by examiner

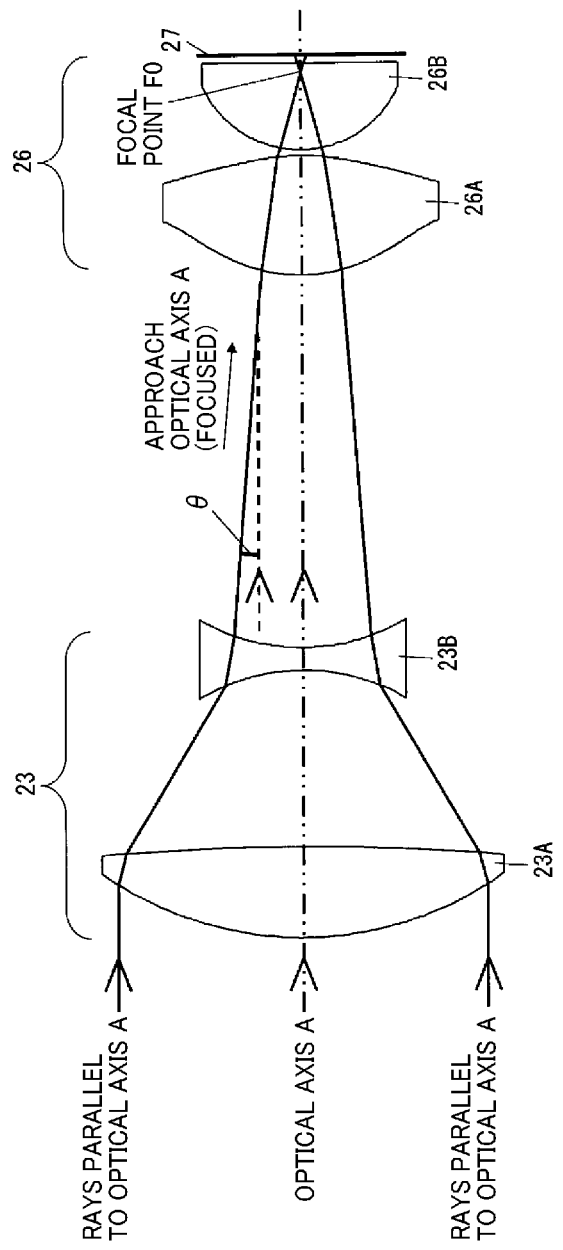

FIG. 8
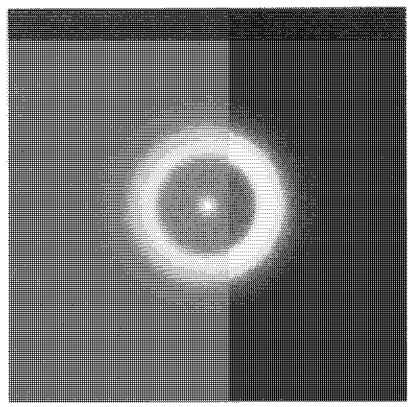 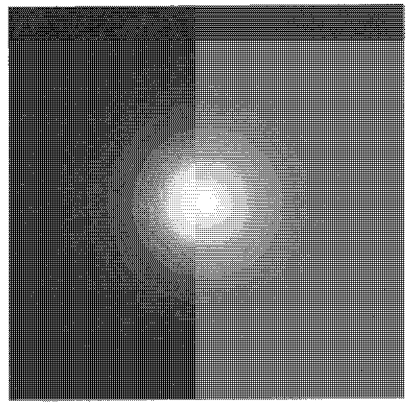
UNDER SIDE-CORRECTION          OVER SIDE-CORRECTION

LIGHT SOURCE OPTICAL SYSTEM, LIGHT SOURCE DEVICE, AND IMAGE PROJECTION APPARATUS

CROSS-REFERENCE TO RELATED APPLICATIONS

The present application is based on PCT filing PCT/JP2019/039440, filed Oct. 7, 2019, and Japanese application 2018-223215, filed Nov. 29, 2018 the entire contents of each are incorporated herein by reference.

TECHNICAL FIELD

The present disclosure relates to a light source optical system, a light source device, and an image projection apparatus.

BACKGROUND ART

Projectors (image projection apparatuses) that magnify and project various images are widely used. A projector focuses light emitted by a light source onto a spatial light modulation element, such as a digital micromirror device (DMD) or a liquid crystal display element, and displays, as a color image, light modulated in accordance with an image signal and emitted from the spatial light modulation element onto a screen.

A projector in many cases uses, for example, a high-brightness extra-high-pressure mercury lamp in related art. However, the life of such a lamp is short and the maintenance is frequently required. Owing to this, the number of projectors using, for example, lasers or light emitting diodes (LEDs) instead of extra-high-pressure mercury lamps is growing. This is because a laser and an LED have longer lives and higher color reproducibility due to monochromaticity than an extra-high-pressure mercury lamp does.

A projector irradiates an image display element such as a DMD with light of, for example, three colors including red, green, and blue which are primary colors to form an image. All the three colors can be generated by laser sources; however, this is not desirable because a green laser and a red laser have lower emission efficiencies than a blue laser does. Thus, there is used a method of irradiating a fluorescent body with a blue laser beam as excitation light to obtain fluorescence through wavelength conversion at the fluorescent body and generating red light and green light from the fluorescence. PTLs 1 and 2 disclose light source optical systems each of which uses (as a combination) such a laser source and a fluorescent body.

PTL 1 discloses an illumination optical system including an excitation light source, a fluorescent-body unit, and a diffusion plate located in an optical path between the excitation light source and the fluorescent-body unit and configured to bring the intensity distribution of the excitation light closer to a uniform state. PTL 2 discloses a light source device including a plurality of light sources, a wavelength conversion element, and a plurality of mirror arrays and a lens array located in optical paths between the plurality of light sources and the wavelength conversion element.

CITATION LIST

Patent Literature

PTL 1: JP-6090875-B
PTL 2: JP-2017-194523-A

SUMMARY OF INVENTION

Technical Problem

To provide a brighter projector, a demand on the projector for enhancing light utilization efficiency increases. The light utilization efficiency by a fluorescent body varies in accordance with the energy density of excitation light incident on the fluorescent body. When the incident excitation light has a high energy density, the temperature rises and the electrons that exist in the fluorescent body and that can be excited decrease. Thus, the efficiency decreases. To address this, the energy density may be uniformized and the spot size may be increased, thereby increasing the light utilization efficiency.

When the spot size of the excitation light on the fluorescent body is increased to hold the energy density of the excitation light on the fluorescent body, the amount of vignetting of rays increases in a downstream (following) optical system. The vignetting whose amount has increased decreases the light utilization efficiency of the entire projector. To increase the light utilization efficiency of the projector, it is important to uniformize the energy density and to obtain the optimal spot size.

With the above-described PTL 1, since the diffusion plate is provided between the excitation light source and the fluorescent-body unit, the intensity of the excitation light incident on the fluorescent-body unit may decrease, and the light utilization efficiency of the entire projector may decrease. With the above-described PTL 2, the mirror arrays and the lens array may cause an increase in the size, complexity, and cost of the apparatus. In addition, absorption by the mirror arrays and the lens array may decrease the efficiency of the excitation light incident on the fluorescent-body unit.

The embodiments of the present disclosure are completed based on the above-described awareness of disadvantages, and an object of the invention is to provide a light source optical system, a light source device, and an image projection apparatus that have high light utilization efficiency and that can be downsized.

Solution to Problem

A light source optical system according to the present embodiment is a light source optical system used with an excitation light source configured to emit first color light. The light source optical system includes a wavelength conversion unit configured to receive the first color light emitted by the excitation light source and emit second color light with a wavelength different from a wavelength of the first color light; and a first optical system having a positive power and a second optical system having a positive power provided in this order in an optical path between the excitation light source and the wavelength conversion unit. The first optical system has an optical characteristic such that, when a ray parallel to an optical axis of the first optical system is incident on the first optical system, a ray emitted from the first optical system is incident on the second optical system while approaching the optical axis. The second optical system has under-corrected spherical aberration at a paraxial focal position of the second optical system.

Advantageous Effects of Invention

With the present invention, a light source optical system, a light source device, and an image projection apparatus that have high light utilization efficiency and that can be downsized can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 5 illustrates an example of rays passing through a first optical system and a second optical system.

FIG. 8 illustrates examples of spots of excitation light on a fluorescent body at an under-correction side and an over-correction side.

DESCRIPTION OF EMBODIMENTS

Figure 1:
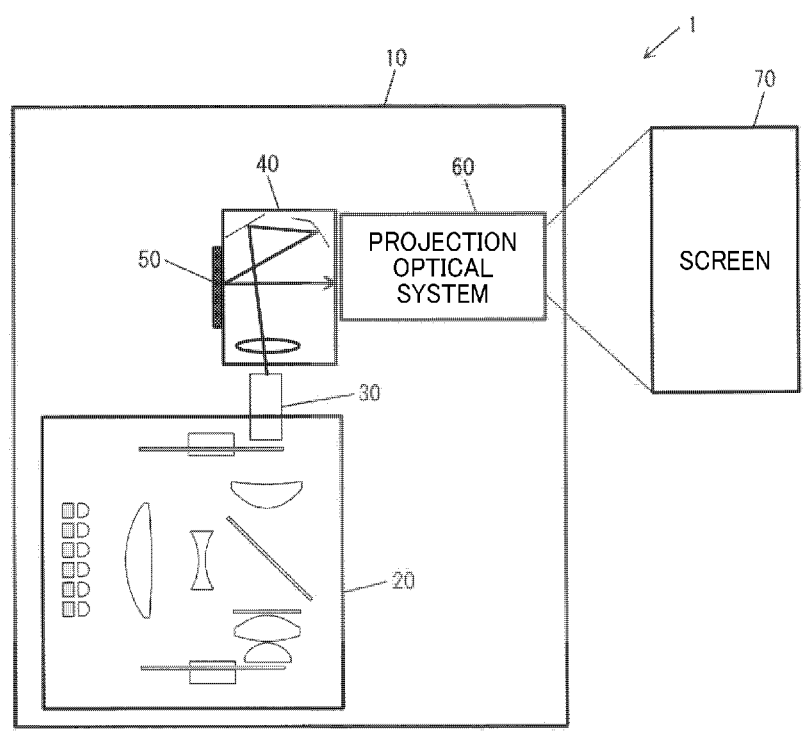
FIG. 1 schematically illustrates a projector according to a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

FIG. 1 schematically illustrates a projector (image projection apparatus) 1 according to a first embodiment.

The projector 1 includes a housing 10, a light source device 20, a light uniformizing element 30, an illumination optical system 40, an image forming element (image display element) 50, and a projection optical system 60.

The housing 10 houses the light source device 20, the light uniformizing element 30, the illumination optical system 40, the image forming element 50, and the projection optical system 60.

The light source device 20 emits, for example, light including wavelengths corresponding to colors of RGB. An inner configuration of the light source device 20 is described later in detail.

The light uniformizing element 30 mixes the light emitted by the light source device 20 to uniformize the light. Examples of the light uniformizing element 30 includes a light tunnel that is a combination of four mirrors, a rod integrator, and a fly eye lens.

The illumination optical system 40 illuminates the image forming element 50 substantially uniformly with the light uniformized by the light uniformizing element 30. The illumination optical system 40 includes, for example, at least one lens and at least one reflecting surface.

The image forming element 50 includes, for example, a light valve, such as a digital micromirror device (DMD), a transmissive liquid crystal panel, or a reflective liquid crystal panel. The image forming element 50 modulates light provided for illumination by the illumination optical system 40 (light from a light source optical system of the light source device 20) to form an image.

The projection optical system 60 magnifies and projects the image formed by the image forming element 50 onto a screen (projection surface) 70. The projection optical system 60 includes, for example, at least one lens.

Figure 2:
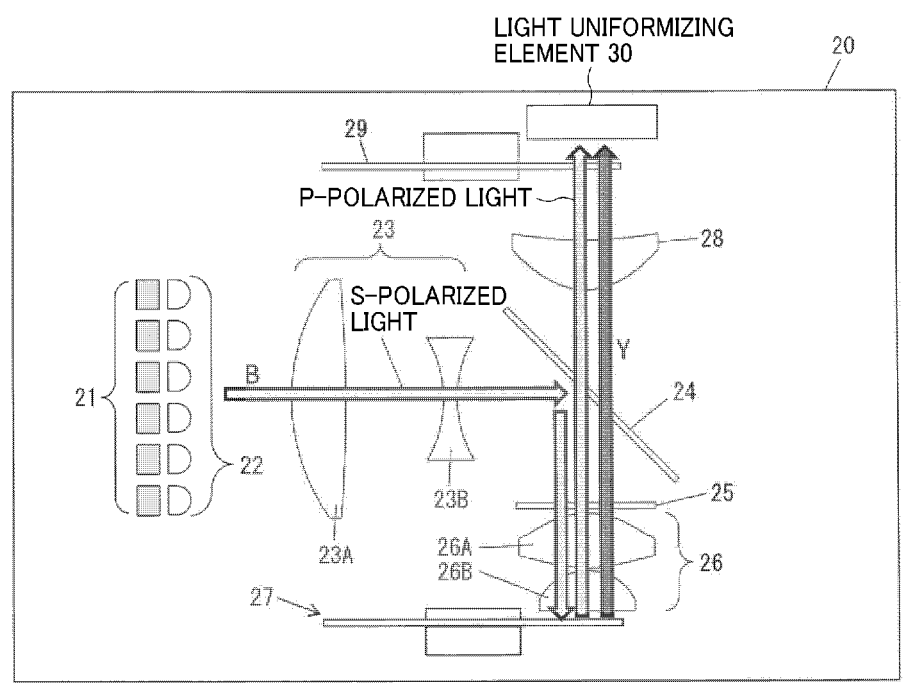
FIG. 2 schematically illustrates a light source device according to the first embodiment.

FIG. 2 schematically illustrates the light source device 20 according to the first embodiment.

The light source device 20 includes a laser source (excitation light source) 21, a collimator lens 22, a first optical system 23, a polarization beam splitter 24, a ¼ wave plate 25, a second optical system 26, a fluorescent-body wheel (wavelength conversion unit, fluorescent-body unit) 27, a condenser lens 28, and a color wheel 29 arranged in this order in a light propagation direction. For example, components of the light source device 20 other than the laser source 21 constitute "a light source optical system".

The laser source 21 includes a plurality of light sources (solid-state light sources). FIG. 2 illustrates six light sources arranged in the up-down direction; however, a subset of six light sources is arranged in four lines in a direction orthogonal to the figure surface (depth direction). Thus, the number 6×4=24 of light sources in total are two-dimensionally arranged. Each light source of the laser source 21 emits, for example, light in a blue band where the center wavelength of emission intensity is 455 nm (blue laser beam) as excitation light B (first color light) that excites a fluorescent body provided in a fluorescent region (wavelength conversion region) 27D (described later) of the fluorescent-body wheel 27. The blue laser beam emitted by each light source of the laser source 21 is linear polarized light in a constant polarized state, and is arranged to be S-polarized light with respect to an incidence surface of the polarization beam splitter 24. The blue laser beam emitted by each light source of the laser source 21 is coherent light. The excitation light B emitted by each light source of the laser source 21 is not limited to light in the blue band and may be light with wavelengths that can excite the fluorescent body in the fluorescent region 27D of the fluorescent-body wheel 27. The number of light sources of the laser source 21 is not limited to 24, and may be 1 to 23, or 25 or more. The laser source 21 can be constituted as a light source unit including a plurality of light sources arrayed on a substrate. However, there is a certain latitude in determining the specific embodiment of the laser source 21.

The collimator lens 22 includes 24 collimator lenses to correspond to the 24 light sources of the laser source 21. Each collimator lens 22 adjusts the excitation light B emitted by the corresponding light source of the laser source 21 to substantially parallel light. The number of collimator lenses 22 can be increased or decreased in accordance with an increase or a decrease in the number of light sources of the laser source 21 so as to correspond to the number of light sources of the laser source 21.

The first optical system 23 entirely has a positive power and includes a positive lens 23A and a negative lens 23B in this order from the laser source 21 side toward the fluorescent-body wheel 27 side. The first optical system 23 guides the excitation light B incident thereon as the substantially parallel light from the collimator lenses 22 to the polarization beam splitter 24 while converging the excitation light B. A specific configuration and an advantageous effect of the first optical system 23 are described later in detail.

The polarization beam splitter 24 has a coat that reflects S-polarized light (first polarization component) in the wavelength band of the excitation light B guided from the first optical system 23, whereas transmits P-polarized light (second polarization component) in the wavelength band of the excitation light B guided from the first optical system 23 and fluorescence (second color light) from the fluorescent-body wheel 27. While the polarization beam splitter 24 having a flat-plate shape is used in the first embodiment, a prism polarization beam splitter 24 may be used. While the polarization beam splitter 24 reflects the S-polarized light in the wavelength band of the excitation light B and transmits the P-polarized light in the wavelength band of the excitation light B, alternatively, the polarization beam splitter 24 may reflect the P-polarized light in the wavelength band of the excitation light B and transmit the S-polarized light in the wavelength band of the excitation light B.

The ¼ wave plate 25 is arranged in a state in which the optical axis thereof is inclined by 45° with respect to the linear polarized light of the excitation light B reflected by the polarization beam splitter 24. The ¼ wave plate 25 converts the excitation light B reflected by the polarization beam splitter 24 from the linear polarized light into circular polarized light.

The second optical system 26 entirely has a positive power and includes a positive lens 26A and a positive lens 26B in this order from a side of the laser source 21 toward a side of the fluorescent-body wheel 27. The second optical system 26 guides the excitation light B converted into the circular polarized light and being incident thereon from the ¼ wave plate 25 to the fluorescent-body wheel 27 while converging the excitation light B. A specific configuration and an advantageous effect of the second optical system 26 are described later in detail.

Figure 3A:
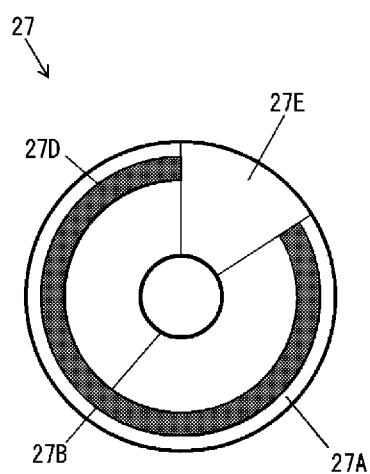
FIG. 3A illustrates a specific structure of a fluorescent-body wheel according to the first embodiment.
Figure 3B:
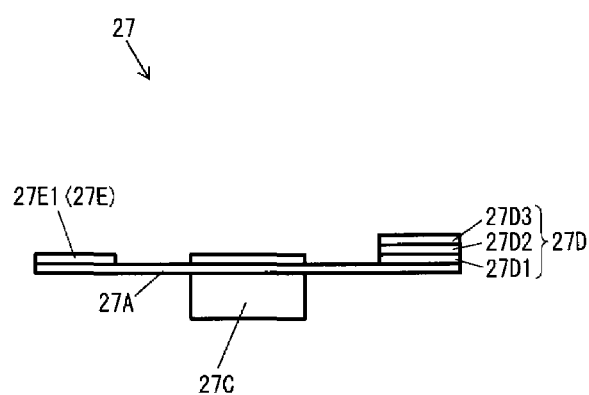
FIG. 3B illustrates the specific structure of the fluorescent-body wheel according to the first embodiment.

The excitation light B guided from the second optical system 26 is incident on the fluorescent-body wheel 27. FIGS. 3A and 3B illustrate a specific structure of the fluorescent-body wheel 27. The fluorescent-body wheel 27 includes a disk member (substrate) 27A and a driving motor (driving member) 27C that rotationally drives the disk member 27A around a rotation shaft 27B. The disk member 27A can use, but is not limited to, for example, a transparent substrate or a metal substrate (aluminum substrate etc.).

A large portion in the circumferential direction (in the first embodiment, an angular range of larger than 270°) of the fluorescent-body wheel 27 (disk member 27A) is assigned to a fluorescent region 27D, and a small portion in the circumferential direction (in the first embodiment, an angular range of smaller than 90°) is assigned to an excitation-light reflective region 27E.

The fluorescent region 27D is constituted by layering a reflection coat 27D1, a fluorescent-body layer 27D2, and an anti-reflection coat (AR coat) 27D3 in this order from a lower-layer side toward an upper-layer side.

The reflection coat 27D1 has a characteristic of reflecting light in a wavelength region of fluorescence (emission) by the fluorescent-body layer 27D2. When the disk member 27A is made of a metal substrate with high reflectivity, the reflection coat 27D1 may be omitted (the disk member 27A may have the function of the reflection coat 27D1).

The fluorescent-body layer 27D2 may use, for example, a substance in which a fluorescent-body material is dispersed into an organic or inorganic binder, a substance in which a crystal of a fluorescent-body material is directly formed, or a rare-earth fluorescent body such as a Ce:YAG-based substance. The wavelength band of the fluorescence (emission) by the fluorescent-body layer 27D2 may be, for example, the wavelength band of yellow, blue, green, or red. In the first embodiment, an example is described in which fluorescence (emission) has the wavelength band of yellow. While the fluorescent body is used as the wavelength conversion element in this embodiment, a phosphorescent body or a non-linear optical crystal may be used.

The anti-reflection coat 27D3 has a characteristic of preventing reflection of light at a surface of the fluorescent-body layer 27D2.

A reflection coat (reflecting surface) 27E1 having a characteristic of reflecting light in the wavelength region of the excitation light B guided from the second optical system 26 is layered on the excitation-light reflective region 27E. When the disk member 27A is made of a metal substrate with high reflectivity, the reflection coat 27E1 may be omitted (the disk member 27A may have the function of the reflection coat 27E1).

The disk member 27A is rotationally driven by the driving motor 27C. Thus, the irradiation position with the excitation light B on the fluorescent-body wheel 27 moves over time. Consequently, a portion of the excitation light B (first color light) incident on the fluorescent-body wheel 27 is converted by the fluorescent region (wavelength conversion region) 27D into fluorescence Y (second color light) with a wavelength different from the wavelength of the excitation light B (first color light) and the fluorescence Y is emitted. The other portion of the excitation light B incident on the fluorescent-body wheel 27 is reflected by the excitation-light reflective region 27E without a change from the excitation light B.

The numbers and ranges of the fluorescent region 27D and the excitation-light reflective region 27E can be freely determined, and various changes can be made in design. For example, two fluorescent regions and two excitation-light reflective regions may be alternately arranged in the circumferential direction at intervals of 90°.

Referring back to FIG. 2, description is given below. The excitation light B reflected by the excitation-light reflective region 27E of the fluorescent-body wheel 27 becomes inverted circular polarized light, and passes through the second optical system 26 and the ¼ wave plate 25 again to be converted into P-polarized light. The excitation light B converted into the P-polarized light is transmitted through the polarization beam splitter 24 and is incident on the color wheel 29 through the condenser lens 28.

The excitation light B incident on the fluorescent region 27D of the fluorescent-body wheel 27 is converted into the fluorescence Y and is emitted. The fluorescence Y is turned into substantially parallel light by the second optical system 26, passes through the ¼ wave plate 25, is transmitted through the polarization beam splitter 24, and is incident on the color wheel 29 through the condenser lens 28.

Figure 4:
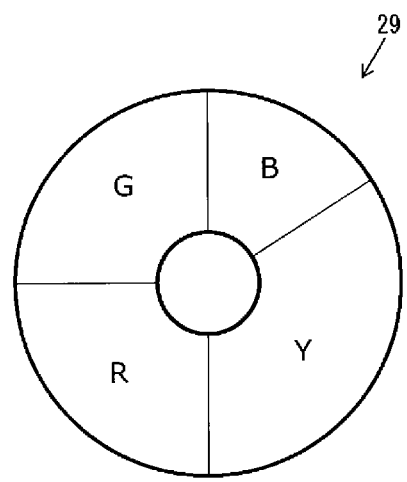
FIG. 4 schematically illustrates a color wheel.

FIG. 4 schematically illustrates a color wheel 29. The color wheel 29 includes a blue region B, a yellow region Y, a red region R, and a green region G divided in the circumferential direction. The blue region B corresponds to the excitation-light reflective region 27E of the fluorescent-body wheel 27. The yellow region Y, the red region R, and the green region G are brought into synchronization with the fluorescent region 27D of the fluorescent-body wheel 27. A transmission diffusion plate (not illustrated) is arranged on the blue region B. Thus, coherence of the laser source 21 can be reduced, and speckles on the screen 70 can be reduced. The yellow region Y directly transmits light in the wavelength region of yellow emitted from the fluorescent-body wheel 27. The red region R and the green region G use dichroic mirrors to reflect light in a non-required wavelength range from the wavelengths of yellow and hence obtain light of highly pure colors. Light of each color generated by the color wheel 29 in a time-division manner is guided from the light uniformizing element 30 through the illumination optical system 40 to the image forming element 50, forms an image corresponding to the color, and magnifies and projects the image onto the screen 70 by the projection optical system 60. Thus, a color image is obtained.

In the first embodiment, the light source optical system includes the laser source 21, the fluorescent-body wheel 27, and the first optical system 23 having a positive power and the second optical system 26 having a positive power, which are provided in this order in an optical path between the laser source 21 and the fluorescent-body wheel 27.

The excitation light B of the S-polarized light passes through the first optical system 23 whereas the fluorescence Y does not pass through the first optical system 23. The excitation light B of the S-polarized light, the excitation light B of the P-polarized light, and the fluorescence Y pass through the second optical system 26. Thus, the first optical system 23 and the second optical system 26 are distinguished from each other in terms of that the fluorescence Y does not pass through the first optical system 23 and the fluorescence Y passes through the second optical system 26. Moreover, the first optical system 23 and the second optical system 26 are divided at a position in the maximum air gap.

Lens data and aspherical surface data of the first optical system 23 and the second optical system 26 are described below.

TABLE 1

[Lens Data]

| | R | D | Nd | Vd | GLASS MATERIAL |
|---|---|---|---|---|---|
| 1 | ∞ | 2.00 | | | |
| 2 | 30.020 | 8.00 | 1.74320 | 49.3394 | S-LAM60 OHARA |
| 3 | −211.312 | 15.50 | | | |
| 4 | −17.456 | 2.00 | 1.48749 | 70.2363 | S-FSL5 OHARA |
| 5 | 17.456 | 32.85 | | | |
| 6* | 13.878 | 10.53 | 1.58913 | 61.1526 | L-BAL35 OHARA |
| 7* | −16.334 | 0.50 | | | |
| 8 | 9.222 | 7.70 | 1.62041 | 60.2896 | S-BSM16 OHARA |
| 9 | ∞ | 0.70 | | | |

TABLE 2

[Aspherical Surface Data]

| | K | A4 | A6 | A8 |
|---|---|---|---|---|
| SIXTH SURFACE | −0.5587 | 3.4062E−05 | −2.4706E−07 | −2.1131E−09 |
| SEVENTH SURFACE | −10.8169 | 4.8564E−05 | −6.3144E−07 | 2.2753E−09 |

As described in the lens data and the aspherical surface data, in the first optical system 23, the positive lens 23A has a biconvex shape and the negative lens 23B has a biconcave shape. In the second optical system 26, the positive lens 26A has a biconvex shape and the positive lens 26B has a planoconvex shape being convex toward an object side. Both sides of the positive lens 26A have aspherical surfaces. The configuration of the second optical system 26 is not limited thereto. For example, only one side of the positive lens 26A may have an aspherical surface, or both sides or one side of the positive lens 26B may have an aspherical surface. The first optical system 23 may include another lens in addition to the positive lens 23A and the negative lens 23B. The second optical system 26 may include another lens in addition to the positive lens 26A and the positive lens 26B. Although not illustrated, an aperture stop for adjusting the light amount of the excitation light B may be provided at any position in the optical path of the light source optical system (for example, a position immediately before the positive lens 23A of the first optical system 23).

FIG. 5 illustrates an example of rays passing through the first optical system 23 and the second optical system 26. As illustrated in FIG. 5, the first optical system 23 has an optical characteristic such that, when rays parallel to an optical axis A of the first optical system 23 are incident on the first optical system 23, rays emitted from the first optical system 23 are incident on the second optical system 26 while approaching (being focused) at an angle θ with respect to the optical axis A. Thus, a focal point F0 of the light incident on the second optical system 26 is formed on a side (near side) of the second optical system 26 with reference to the incidence surface of the fluorescent-body wheel 27. Consequently, a larger and more uniform image is obtained, thereby increasing light conversion efficiency of the fluorescent-body wheel 27.

Figure 6A:
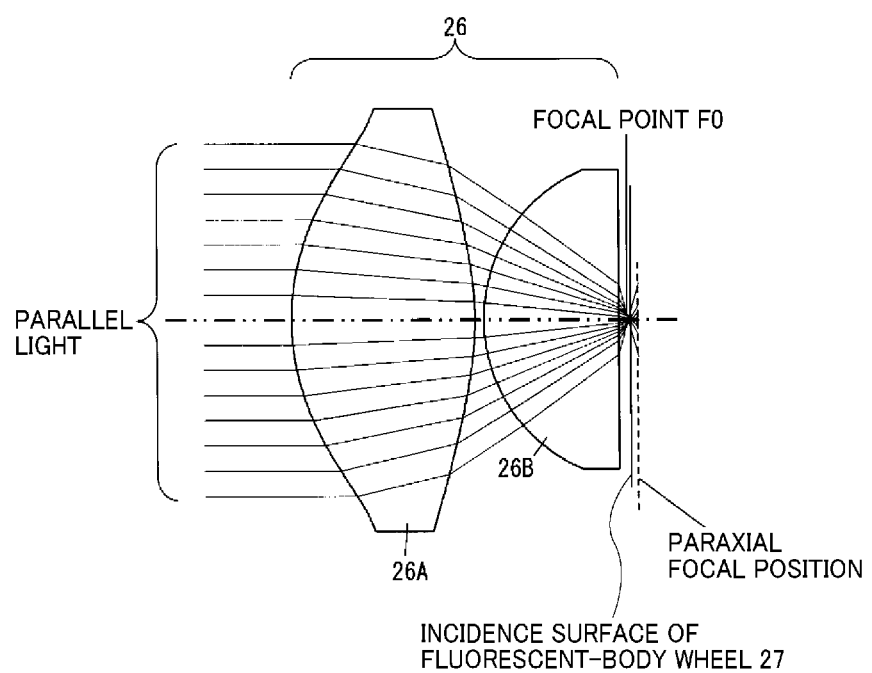
FIG. 6A illustrates an example of under-corrected spherical aberration by the second optical system.
Figure 6B:
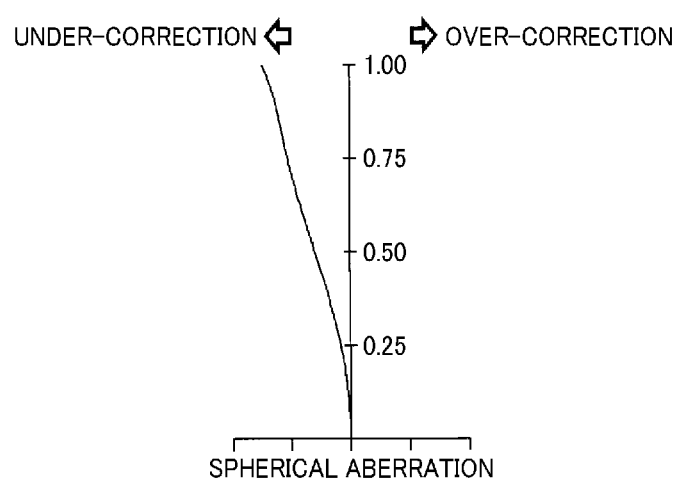
FIG. 6B illustrates the example of under-corrected spherical aberration by the second optical system.

As illustrated in FIGS. 6A and 6B, the second optical system 26 has under-corrected spherical aberration at the paraxial focal position of the second optical system 26. Although FIGS. 6A and 6B illustrate a case where parallel light is incident on the second optical system 26, in an actual situation, convergent light by the first optical system 23 is incident on the second optical system 26. In either case of the incident light on the second optical system 26 being parallel light or convergent light, the second optical system 26 has under-corrected spherical aberration.

Figure 7:
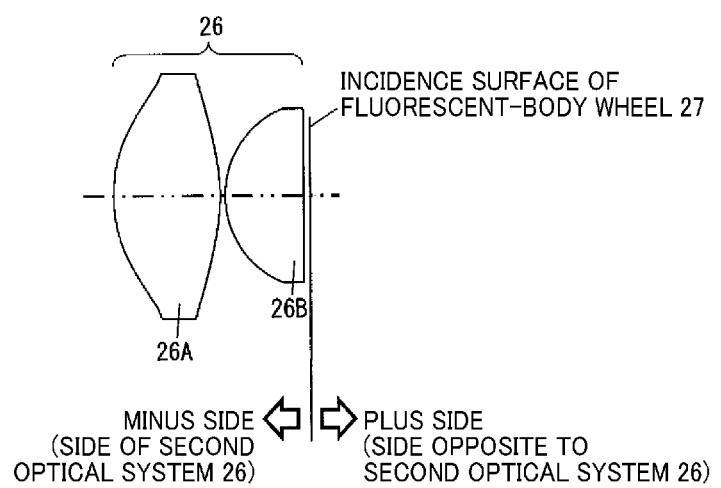
FIG. 7 illustrates a plus side and a minus side with reference to an incidence surface of the fluorescent-body wheel.

As illustrated in FIG. 7, a side of the second optical system 26 with reference to the incidence surface of the fluorescent-body wheel 27 is defined as "a minus side (near side)" and a side opposite to the second optical system 26 is defined as "a plus side (deep side)". The paraxial focal position of the second optical system 26 is set at "the plus side (deep side)".

As illustrated in FIGS. 6 and 7, the focal point (focal position) F0 by the first optical system 23 and the second optical system 26 is located on "the minus side (near side)" with reference to the incidence surface of the fluorescent-body wheel 27, and the paraxial focal position of the second optical system 26 is located on "the plus side (deep side)" with reference to the incidence surface of the fluorescent-body wheel 27. Since the positions and optical characteristics of the first optical system 23 and the second optical system 26 are determined as described above, a spot of excitation light B on a fluorescent body can have a proper size, uniform shape, and uniform intensity, thereby increasing light conversion efficiency of the fluorescent-body wheel 27.

The first optical system 23 has under-corrected spherical aberration at the paraxial focal position of the first optical system 23 like the second optical system 26. Since the first optical system 23 has under-corrected spherical aberration, rays of a light source at a position far from the optical axis A is more likely focused on the side of the first optical system 23.

FIG. 8 illustrates examples of spots of excitation light on a fluorescent body at an under-correction side and an over-correction side. Since the second optical system 26 has under-corrected spherical aberration at the paraxial focal position, as illustrated in FIG. 8, the under-correction side exhibits a distribution that incident uniform light turns into light with high intensity at a center portion and a peripheral portion, and the over-correction side exhibits a uniform distribution corresponding to incident uniform light.

As described above, the focal point (focal position) F0 by the first optical system 23 and the second optical system 26 is formed on the minus side. Thus, fluorescent body spots have a distribution close to the distribution on the over-correction side in FIG. 8, and more likely become uniform spots.

In contrast, when the first optical system 23 is constituted such that light emitted from the first optical system 23 diverges (away from the optical axis A), the focal point F0 moves to the plus side and spots have a plurality of extreme values like the under-correction side in FIG. 8, thereby decreasing conversion efficiency of a fluorescent body. When the paraxial focal position of the second optical system 26 is arranged on the minus side, a uniform blur like one on the over-correction side in FIG. 8 can be obtained. However, the distance between the second optical system 26 and the fluorescent-body wheel 27 increases, and capturing efficiency of fluorescence emitted from a fluorescent body decreases.

In the first embodiment, the paraxial focal position of the second optical system 26 is arranged on the plus side, the first optical system 23 is arranged to emit focused light, and hence the focal point F0 is formed on the minus side, thereby obtaining a uniform image and increasing both conversion efficiency of a fluorescent body and capturing efficiency of fluorescence emitted from the fluorescent body.

Figure 9:
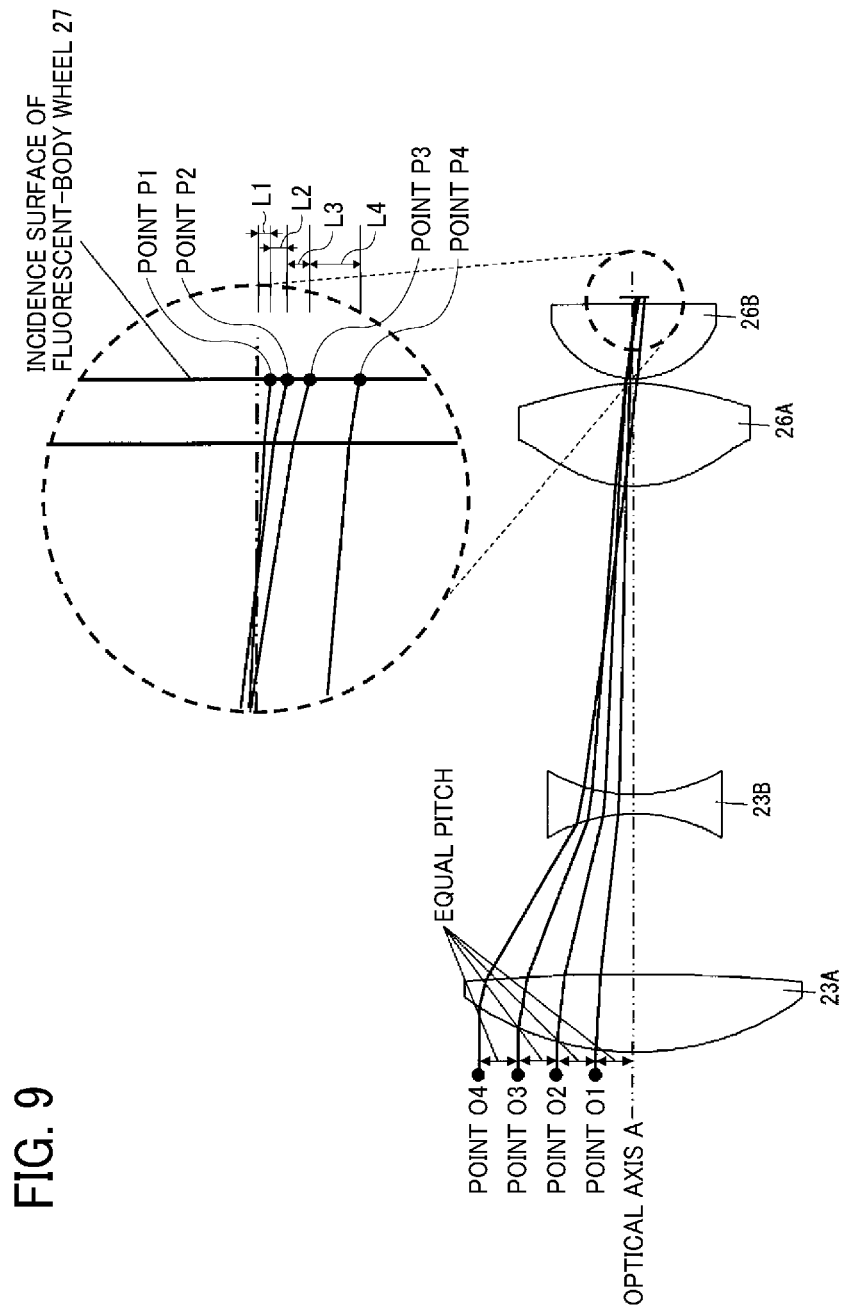
FIG. 9 illustrates paths of rays from the first optical system to the incidence surface of the fluorescent-body wheel.

As illustrated in FIG. 9, four points O1, O2, O3, and O4 arranged within the outer diameter range of the first optical system 23 on the side closest to the laser source 21 at equal pitches in a direction orthogonal to the optical axis A and away from the optical axis A are determined. When rays parallel to the optical axis A are emitted from the four points O1, O2, O3, and O4, a number n of intersection points P1, P2, P3, and P4 at which rays emitted from the second optical system 26 intersect with the incidence surface of the fluorescent-body wheel 27 are determined. In this case, L1<L2<L3<L4 is satisfied where L1 is a distance between the optical axis A and the intersection point P1 corresponding to the point O1, L2 is a distance between the intersection point P1 corresponding to the point O1 and the intersection point P2 corresponding to the point O2, L3 is a distance between the intersection point P2 corresponding to the point O2 and the intersection point P3 corresponding to the point O3, and L4 is a distance between the intersection point P3 corresponding to the point O3 and the intersection point P4 corresponding to the point O4.

Generalizing the above situation, when rays parallel to the optical axis A are emitted from a number n of points O1, O2, . . . , and On arranged within the outer diameter range of the first optical system 23 on the side closest to the laser source 21 at equal pitches in a direction orthogonal to the optical axis A and away from the optical axis A, and when a number n of intersection points P1, P2, . . . , and Pn at which rays emitted from the second optical system 26 intersect with the incidence surface of the fluorescent-body wheel 27 are determined, the following conditional expressions (1) and (2) are satisfied. Note that not both but one of conditional expressions (1) and (2) may be satisfied. Conditional expression (1) is satisfied if conditional expression (2) is satisfied; however, conditional expression (1) can be satisfied whereas conditional expression (2) is not satisfied. For example, a portion that satisfies $L_n \leq L_{n-1}$ may be included. (1) $L_n > L_1$ (n being an integer equal to or larger than 2), and (2) $L_n > L_{n-1}$ (n being an integer equal to or larger than 2) are satisfied, where L1 is a distance between the optical axis and the intersection point P1 corresponding to the point O1, Ln is a distance between the intersection point Pn corresponding to the point On and the intersection point Pn−1 corresponding to the point On−1, and Ln−1 is a distance between the intersection point Pn−1 corresponding to the point On−1 and the intersection point Pn−2 corresponding to the point On−2.

Conditional expressions (1) and (2) are satisfied when the second optical system 26 has under-corrected spherical aberration at the paraxial focal position of the second optical system 26 and when the focal point F0 by the first optical system 23 and the second optical system 26 are located on the minus side.

Figure 10:
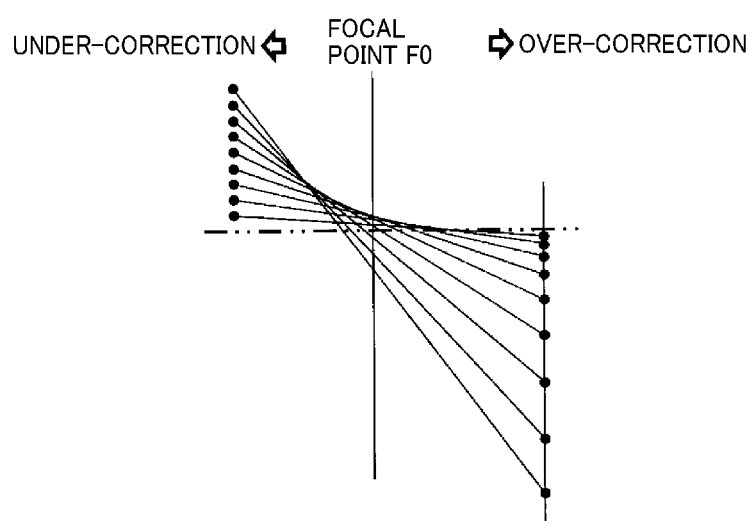
FIG. 10 illustrates an overview of rays when spherical aberration is under-corrected.

FIG. 10 illustrates an overview of rays when spherical aberration is under-corrected. Rays on the under-correction side with respect to the focal point F0 are at uniform pitches whereas rays on the over-correction side with respect to the focal point F0 are at non-uniform pitches. Thus, when a plurality of light sources are used, light from the light sources non-uniformly land on (arrive at) the incidence surface of the fluorescent-body wheel 27. A relative maximum portion is less likely generated and a uniform spot can be formed. In addition, the spot size can be increased. Since the pitches are dense around the optical axis A, it is further desirable not to form a light source on the optical axis A.

As illustrated in FIGS. 9 and 10, the number n of points O1, O2, . . . , and On and the number n of intersection points P1, P2, . . . , and Pn corresponding thereto are located on the opposite sides with respect to the optical axis A. More specifically, the number n of points O1, O2, . . . , and On are located in the upper region with respect to the optical axis A serving as the boundary, and the number n of intersection points P1, P2, . . . , and Pn are located in the lower region with respect to the optical axis A serving as the boundary. Thus, a uniform spot shape can be obtained, thereby increasing light conversion efficiency of the fluorescent-body wheel 27.

Figure 11:
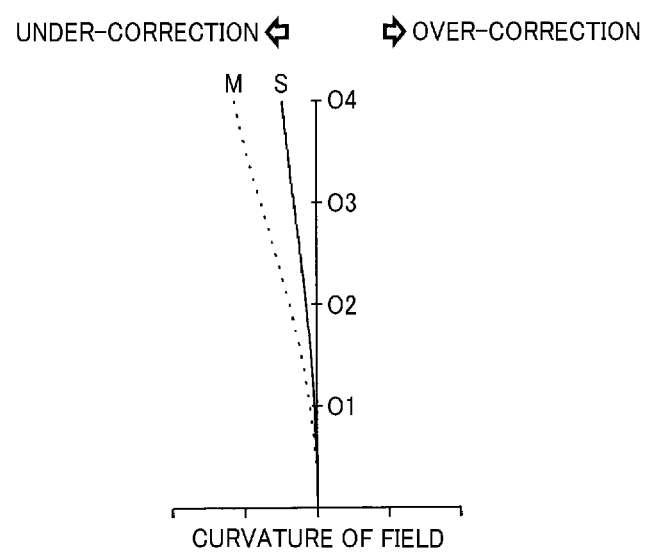
FIG. 11 is an aberration diagram illustrating curvature of field of a combined optical system including the first optical system and the second optical system.

FIG. 11 is an aberration diagram illustrating curvature of field of a combined optical system including the first optical system 23 and the second optical system 26. As illustrated in FIG. 11, the combined optical system including the first optical system 23 and the second optical system 26 may have under-corrected curvature of field, thereby obtaining a further uniform spot shape.

Figure 12:
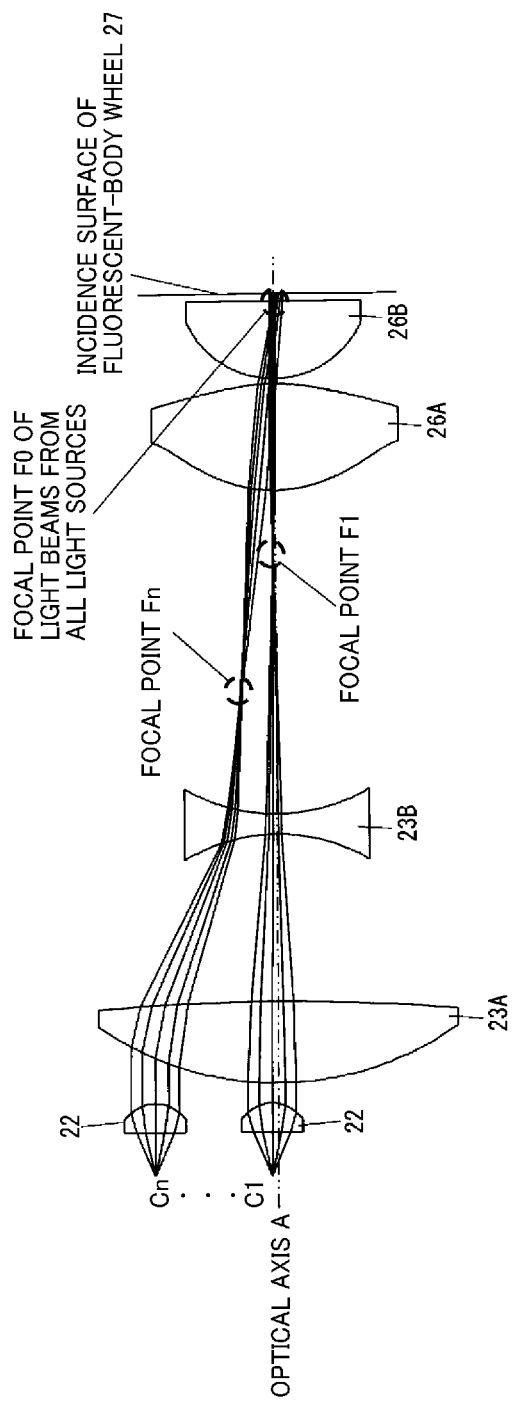
FIG. 12 illustrates the positional relationship among focal points of light beams from light sources and collimator lenses.

FIG. 12 illustrates the positional relationship among focal points of light beams from light sources and collimator lenses. As illustrated in FIG. 12, when F1 denotes a focal point of light beams emitted by a light source C1 (21) closest to the optical axis A and Fn denotes a focal point of light beams emitted by a light source Cn (21) farthest from the optical axis A, focal points F1 and Fn are located between the first optical system 23 and the second optical system 26, and the focal point Fn is located on a side of the first optical system 23 (near side) with respect to the focal point F1. As described above, when the focal point of light beams emitted by all light sources C1 to Cn (21) is F0, the focal point F0 is formed on the minus side (near side) with respect to the incidence surface of the fluorescent-body wheel 27. Thus, a spot on the fluorescent body wheel 27 is increased in size and becomes uniform.

Figure 13:
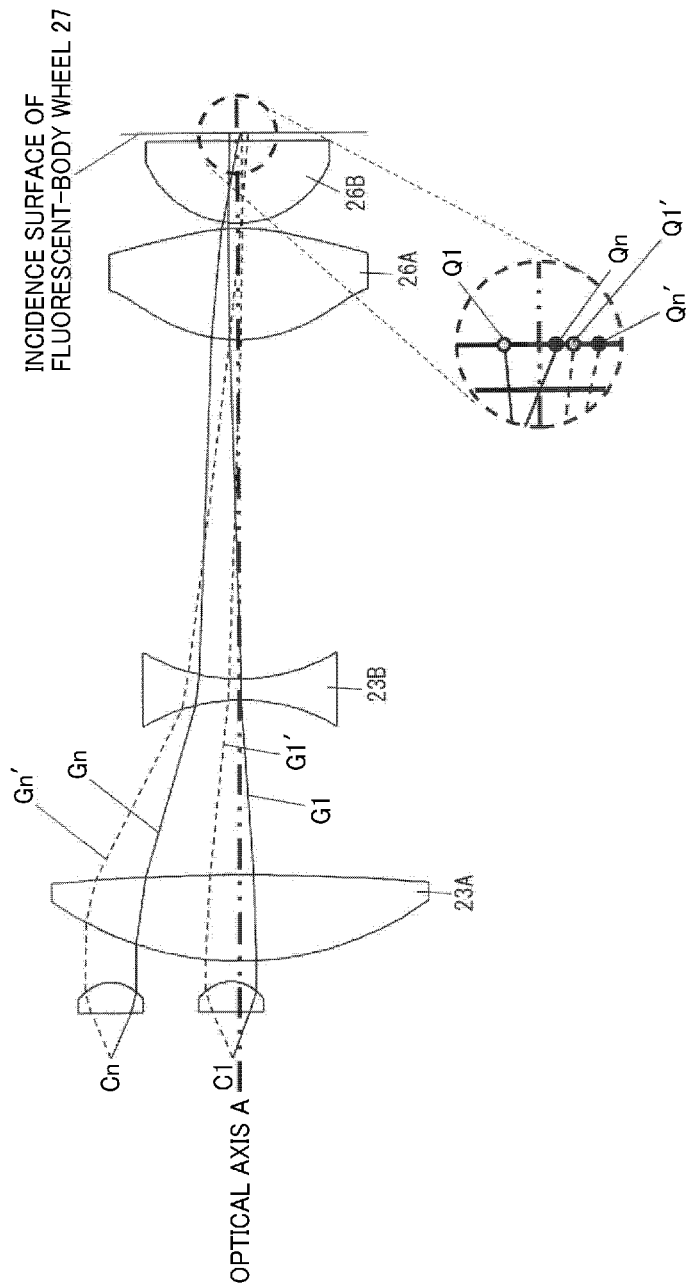
FIG. 13 illustrates marginal rays of light beams from the light sources and the collimator lenses.

FIG. 13 illustrates marginal rays of light beams from the light sources and the collimator lenses. Referring to FIG. 13, G1 denotes a marginal ray closest to the optical axis A among marginal rays of light beams emitted by the light source C1 (21) closest to the optical axis A, and Gn denotes a marginal ray closest to the optical axis A among marginal rays of light beams emitted by the light source Cn (21) farthest from the optical axis A (G1 and Gn are plotted by solid lines). Moreover, G1' denotes a marginal ray farthest from the optical axis A among marginal rays of light beams emitted by the light source C1 (21) closest to the optical axis A, and Gn' denotes a marginal ray farthest from the optical axis A among marginal rays of light beams emitted by the light source Cn (21) farthest from the optical axis A (G1' and Gn' are plotted by broken lines). Furthermore, Q1 denotes an intersection point at which the marginal ray G1 intersects with the incidence surface of the fluorescent-body wheel 27, Q1' denotes an intersection point at which the marginal ray G1' intersects with the incidence surface of the fluorescent-body wheel 27, Qn denotes an intersection point at which the marginal ray Gn intersects with the incidence surface of the fluorescent-body wheel 27, and Qn' denotes an intersection point at which the marginal ray Gn' intersects with the incidence surface of the fluorescent-body wheel 27.

The light source Cn (21) farthest from the optical axis A and the intersection point Qn are located on the opposite sides with respect to the optical axis A. More specifically, the light source Cn (21) farthest from the optical axis A is located in the upper region with respect to the optical axis A serving as the boundary, and the intersection point Qn is located in the lower region with respect to the optical axis A serving as the boundary. The intersection point Qn is set to $1/e^2$ of the maximum intensity in a profile of light beams.

Figure 14A:
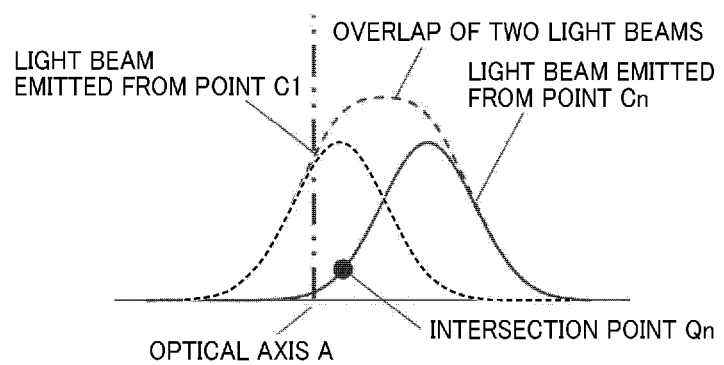
FIG. 14A illustrates a profile of light beams on the incidence surface of the fluorescent-body wheel.
Figure 14B:
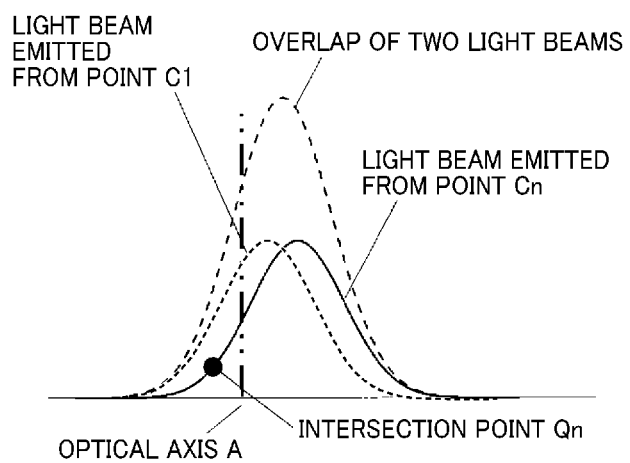
FIG. 14B illustrates a profile of light beams on the incidence surface of the fluorescent-body wheel.

FIGS. 14A and 14B illustrate profiles of light beams on the incidence surface of the fluorescent-body wheel 27. FIGS. 14A and 14B illustrate a profile (solid line) of light beams emitted by the light source C1 (21) closest to the optical axis A, a profile (solid line) of light beams emitted by the light source Cn (21) farthest from the optical axis A, and a profile (broken line) of light beams obtained by an overlap of the two light beams.

As illustrated in FIG. 14A, since the light source Cn (21) farthest from the optical axis A and the intersection point Qn are located on the opposite sides with respect to the optical axis A, an overlap of light beams emitted by the light source C1 (21) closest to the optical axis A and light beams emitted by the light source Cn (21) farthest from the optical axis A on the fluorescent-body wheel 27 decreases, thereby obtaining a uniform profile with a low energy density.

In contrast, FIG. 14B illustrates a case where the light source Cn (21) farthest from the optical axis A and the intersection point Qn are located on the same side with respect to the optical axis A. In this case, an overlap of light beams emitted by the light source C1 (21) closest to the optical axis A and light beams emitted by the light source Cn (21) farthest from the optical axis A on the fluorescent-body wheel 27 increases, and hence a profile with a significantly high energy density is obtained, thereby decreasing conversion efficiency of the fluorescent-body wheel 27.

Figure 15:
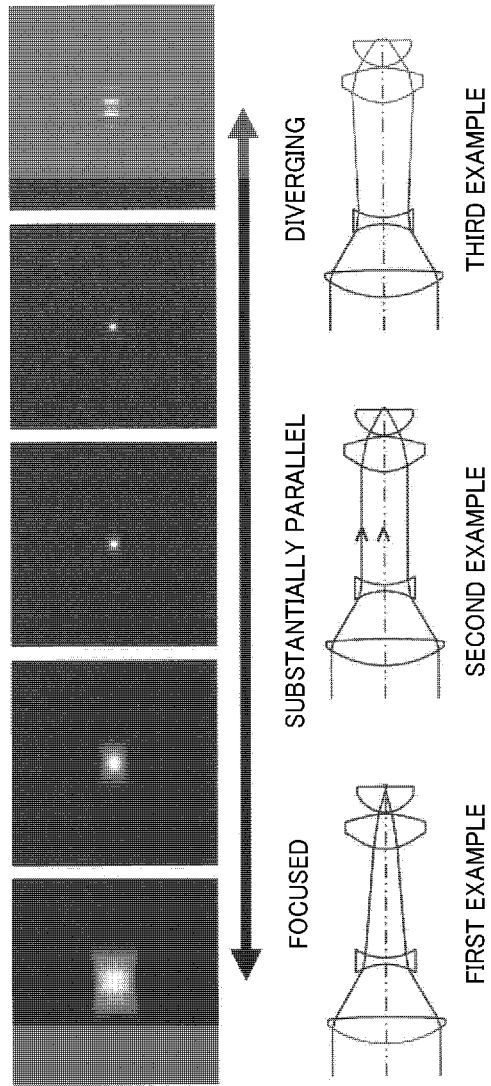
FIG. 15 illustrates examples of actual spot shapes on a fluorescent-body wheel.

Next, actual spot shapes on the fluorescent-body wheel 27 are described. FIG. 15 illustrates examples of calculation (simulation) of spot shapes on the fluorescent-body wheel 27 when a plurality of light sources are used. The examples include a first example (corresponding to the first embodiment) in which light emitted from the first optical system 23 is focused to approach the optical axis A, a second example (corresponding to a comparative example) in which light emitted from the first optical system 23 becomes substantially parallel to the optical axis A, and a third example (corresponding to a comparative example) in which light emitted from the first optical system 23 diverges away from the optical axis A.

As illustrated in FIG. 15, in the second example, a spot of excitation light on a fluorescent body has a uniform distribution; however, the spot diameter is very small, thereby decreasing light conversion efficiency of the fluorescent-body wheel 27. In the third example, the size of a spot of excitation light on a fluorescent body is increased; however, a plurality of extreme values are generated, thereby decreasing light conversion efficiency of the fluorescent-body wheel 27. In contrast, in the first example, the size of a spot of excitation light on a fluorescent body is increased while uniformity of the spot of the excitation light on the fluorescent body is kept.

Figure 16:
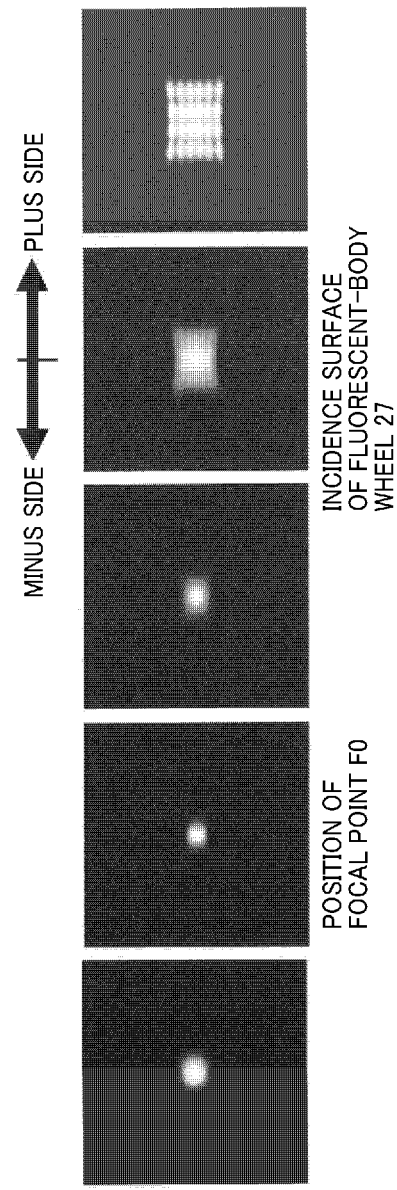
FIG. 16 illustrates examples of spots of excitation light on a fluorescent body on a plus side and a minus side in an optical-axis direction.

FIG. 16 illustrates examples of spots of excitation light on a fluorescent body on the plus side and the minus side in the optical-axis direction. As illustrated in FIG. 16, the spot on the incidence surface of the fluorescent-body wheel 27 is a uniform and large fluorescent body spot. On the plus side (deep side) of the incidence surface of the fluorescent-body wheel 27, a portion with high intensity and a portion with low intensity appear in correspondence with a plurality of light sources. The respective portions form large spots and each have uniform intensity. The energy density of excitation light entering the fluorescent-body wheel 27 does not markedly increase and can prevent a decrease in light conversion efficiency of the fluorescent-body wheel 27. On the minus side (near side) of the incidence surface of the fluorescent-body wheel 27, the focused spot diameter of excitation light decreases in size, thereby decreasing light conversion efficiency of the fluorescent-body wheel 27.

As described above, like the first embodiment, the second optical system 26 has under-corrected spherical aberration and the first optical system 23 emits parallel light as focused light. Thus, the light beams emitted by the respective light sources have uniform profiles, and an overlap of the respective profiles can be proper. The profiles of spots of excitation light on a fluorescent body can be uniformized and light conversion efficiency of the fluorescent-body wheel 27 can be maximized.

Second Embodiment

Figure 17:
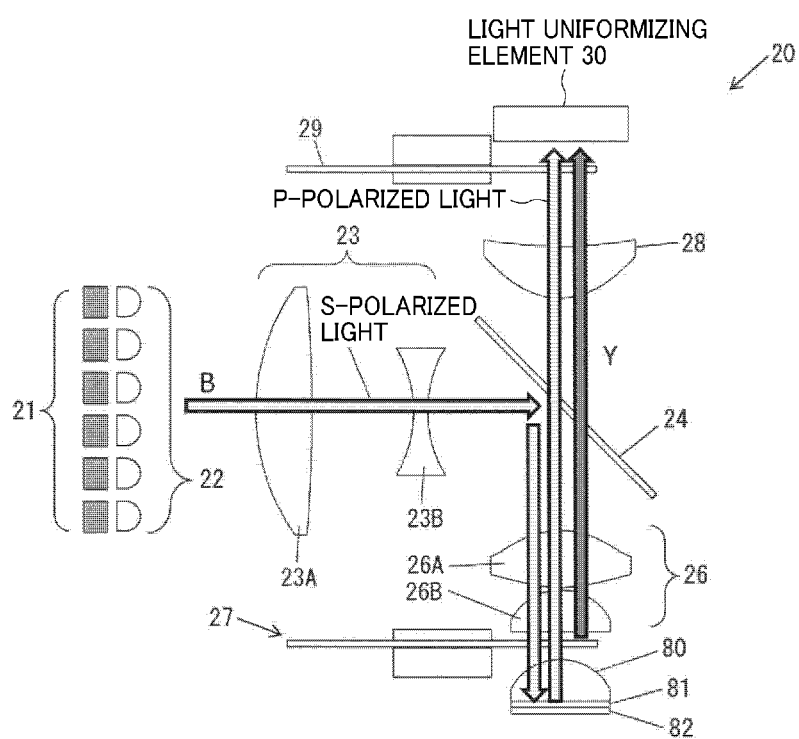
FIG. 17 schematically illustrates a light source device according to a second embodiment.

A projector 1 according to a second embodiment is described below in detail with reference to FIGS. 17 and 18. The same reference sign is applied to a configuration common to that of the first embodiment, and the redundant description is omitted.

In the second embodiment, the ¼ wave plate 25, which is arranged between the polarization beam splitter 24 and the second optical system 26 of the first embodiment, is omitted, and a collimator lens 80, a ¼ wave plate 81, and a reflecting surface 82 are provided on a side opposite to the second optical system 26 with respect to the fluorescent-body wheel 27. In addition, the fluorescent-body wheel 27 has a configuration different from that of the first embodiment.

Figure 18A:
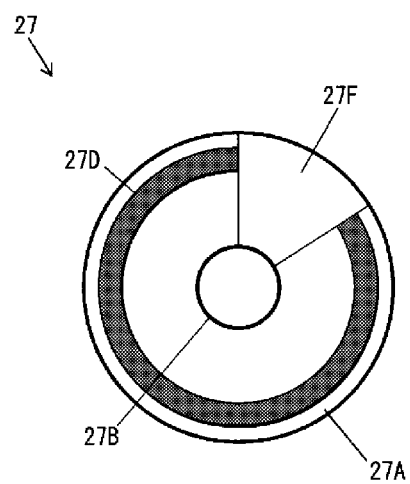
FIG. 18A illustrates a specific structure of a fluorescent-body wheel according to the second embodiment.
Figure 18B:
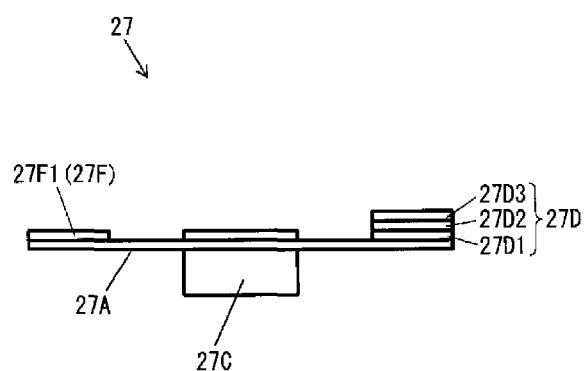
FIG. 18B illustrates the specific structure of the fluorescent-body wheel according to the second embodiment.

FIGS. 18A and 18B illustrate a specific structure of the fluorescent-body wheel 27 according to the second embodiment. The fluorescent-body wheel 27 of the second embodiment includes an excitation-light transmissive region 27F instead of the excitation-light reflective region 27E of the first embodiment. The excitation-light transmissive region 27F has a characteristic of transmitting light in a wavelength region of the excitation light B guided from the second optical system 26. The excitation-light transmissive region 27F has an anti-reflection coat (AR coat, transmitting surface) 27F1 that prevents reflection of the excitation light B guided from the second optical system 26.

The excitation light B transmitted through the excitation-light transmissive region 27F of the fluorescent-body wheel 27 is turned into parallel light by the collimator lens 80, is converted into circular polarized light by the ¼ wave plate 81, and is reflected by the reflecting surface 82 to be inverted circular polarized light. Then, the excitation light B is converted into P-polarized light by the ¼ wave plate 81, is transmitted through the collimator lens 80, the second optical system 26, and the polarization beam splitter 24, and is incident on the color wheel 29 through the condenser lens 28.

While the excitation light B is turned into the parallel light by using the collimator lens 80 in the second embodiment, a ¼ wave plate with no angle dependence may be used and the collimator lens may be omitted. While the collimator lens 80, the ¼ wave plate 81, and the reflecting surface 82 are optically in contact with one another, the collimator lens 80, the ¼ wave plate 81, and the reflecting surface 82 may be optically separated from one another.

Third Embodiment

Figure 19:
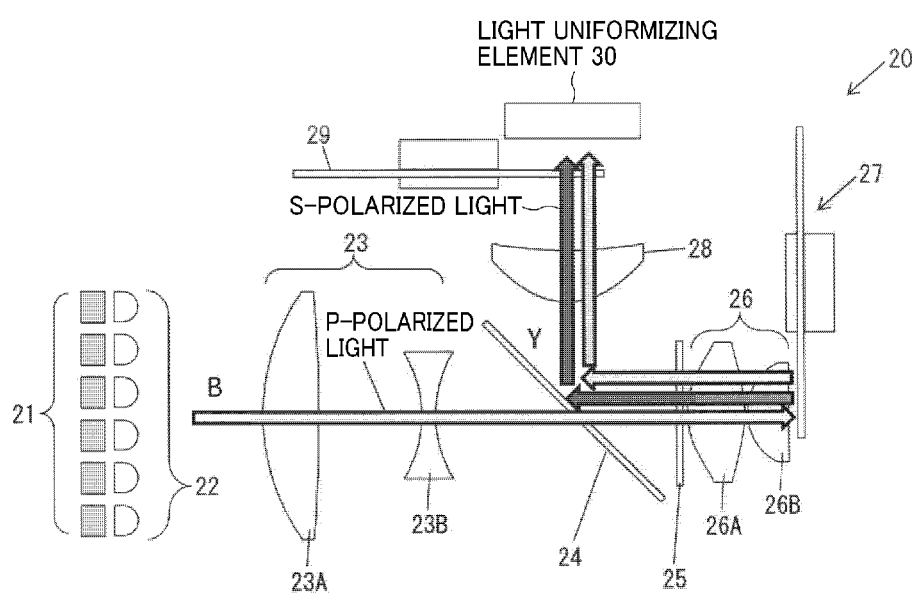
FIG. 19 schematically illustrates a light source device according to a third embodiment.

A projector 1 according to a third embodiment is described below in detail with reference to FIG. 19. The same reference sign is applied to a configuration common to that of the first embodiment, and the redundant description is omitted.

The third embodiment differs from the first embodiment for the following points. In particular, the excitation light B emitted by the laser source 21 is P-polarized light, and the polarization beam splitter 24 has a characteristic of transmitting the excitation light B of the P-polarized light guided from the first optical system 23, and reflecting the excitation light B converted into S-polarized light and fluorescence Y from the ¼ wave plate 25, the second optical system 26, and the fluorescent-body wheel 27.

Fourth Embodiment

Figure 20:
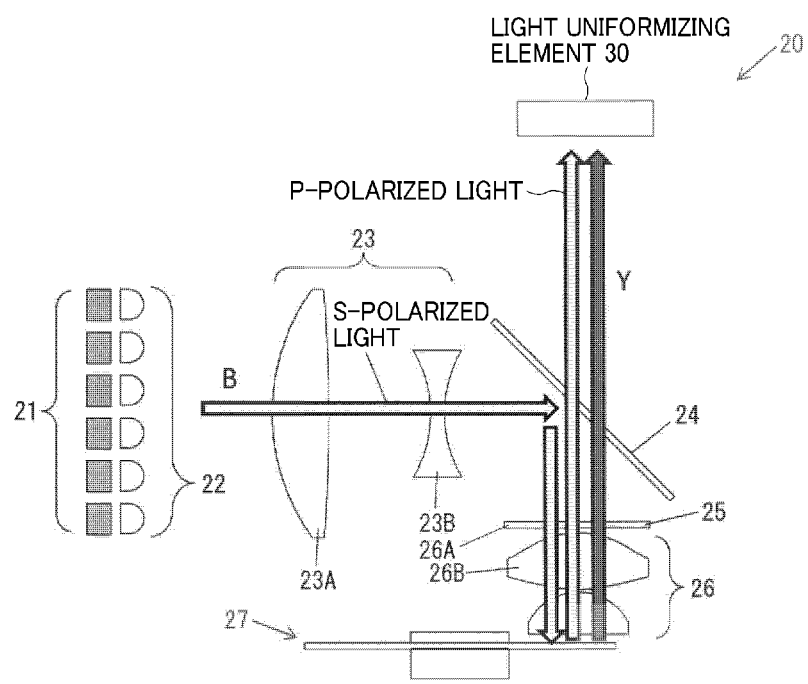
FIG. 20 schematically illustrates a light source device according to a fourth embodiment.

A projector 1 according to a fourth embodiment is described below in detail with reference to FIGS. 20 and 21. The same reference sign is applied to a configuration common to that of the first embodiment, and the redundant description is omitted.

The fourth embodiment differs from the first embodiment in that the condenser lens 28 and the color wheel 29 are omitted and the fluorescent-body wheel 27 has a different configuration.

Figure 21A:
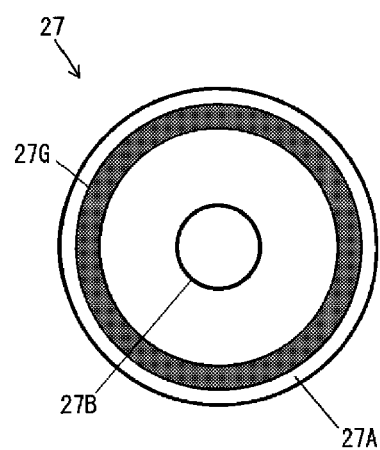
FIG. 21A illustrates a specific structure of a fluorescent-body wheel according to the fourth embodiment.
Figure 21B:
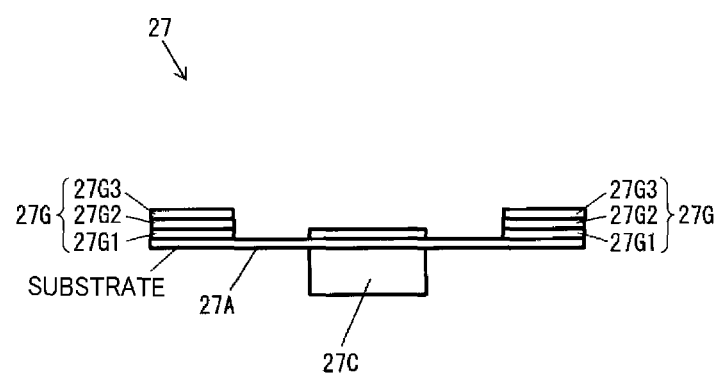
FIG. 21B illustrates the specific structure of the fluorescent-body wheel according to the fourth embodiment.

FIGS. 21A and 21B illustrate a specific structure of the fluorescent-body wheel 27 according to the fourth embodiment. The fluorescent-body wheel 27 of the fourth embodiment is not divided into the fluorescent region 27D and the excitation-light reflective region 27E in the circumferential direction unlike the first embodiment, and a fluorescent region (wavelength conversion region) 27G is provided entirely in the circumferential direction.

The fluorescent region 27G is constituted by layering a first reflection coat 27G1, a fluorescent-body layer 27G2, and a second reflection coat 27G3 in this order from a lower-layer side toward an upper-layer side.

The first reflection coat 27G1 has a characteristic of reflecting light in a wavelength region of the excitation light B guided from the second optical system 26 and light in a wavelength region of fluorescence (emission) by the fluorescent-body layer 27G2.

The fluorescent-body layer 27G2 may use, for example, a substance in which a fluorescent-body material is dispersed into an organic or inorganic binder, a substance in which a crystal of a fluorescent-body material is directly formed, or a rare-earth fluorescent body such as a Ce:YAG-based substance. The wavelength band of the fluorescence (emission) by the fluorescent-body layer 27G2 may be, for example, the wavelength band of yellow. Thus, by combining yellow with blue of the excitation light, white light can be obtained.

The second reflection coat 27G3 has a characteristic of reflecting a portion of the excitation light B guided from the second optical system 26, and transmitting the other portion of the excitation light B guided from the second optical system 26 and the fluorescence (emission) by the fluorescent-body layer 27G2.

The excitation light B reflected by the second reflection coat 27G3 of the fluorescent-body wheel 27 becomes inverted circular polarized light, and passes through the second optical system 26 and the ¼ wave plate 25 again to be converted into P-polarized light. The excitation light B converted into the P-polarized light is transmitted through the polarization beam splitter 24 and is incident on the light uniformizing element 30. In contrast, the excitation light B transmitted through the second reflection coat 27G3 of the fluorescent-body wheel 27 is converted into fluorescence Y by the fluorescent-body layer 27G2 and is reflected by the first reflection coat 27G1. The fluorescence Y is turned into substantially parallel light by the second optical system 26, passes through the ¼ wave plate 25, and is incident on the light uniformizing element 30.

Fifth Embodiment

Figure 22:
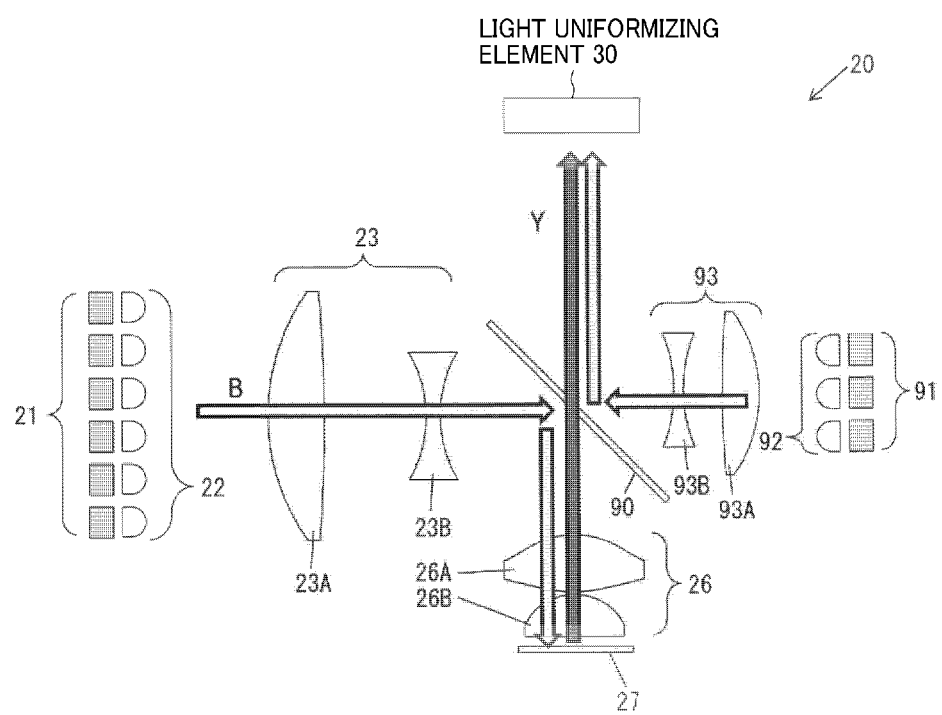
FIG. 22 schematically illustrates a light source device according to a fifth embodiment.

A projector 1 according to a fifth embodiment is described below in detail with reference to FIGS. 22 and 23. The same reference sign is applied to a configuration common to that of the first embodiment, and the redundant description is omitted.

The fifth embodiment differs from the first embodiment in that the polarization beam splitter 24, the ¼ wave plate 25, the condenser lens 28, and the color wheel 29 are omitted. Moreover, a dichroic mirror 90 is provided at the position at which the polarization beam splitter 24 is provided in the first embodiment. Furthermore, a blue light source 91, a collimator lens 92, and a third optical system 93 are provided on a side opposite to the first optical system 23 with respect to the dichroic mirror 90.

The blue light source 91 includes a plurality of light sources (solid-state light sources). Each light source of the blue light source 91 emits light (blue laser beam) in a blue wavelength range that differs from the wavelength range of the excitation light B. The collimator lens 92 includes a plurality of collimator lenses to correspond to the plurality of light sources of the blue light source 91. FIG. 22 illustrates three blue light sources 91 and three collimator lenses 92 arranged in the up-down direction; however, a subset of three blue light sources 91 and a subset of three collimator lenses 92 may be each arranged in a plurality of lines in the direction orthogonal to the figure surface (depth direction) (or may be two dimensionally arranged). Each collimator lens 92 adjusts the blue laser beam emitted by the corresponding light source of the blue light source 91 to parallel light. The number of blue light sources 91 and the number of collimator lenses 92 can be properly increased or decreased. The third optical system 93 includes a biconvex positive lens 93A and a biconcave negative lens 93B. The third optical system 93 transmits the blue laser beam emitted by the blue light source 91 and the collimator lens 92 and guides the blue laser beam to the dichroic mirror 90. The blue light source 91 may include, for example, a light-emitting diode instead of the laser source.

The dichroic mirror 90 reflects the excitation light B guided from the first optical system 23 to the second optical system 26, and reflects the blue laser beam guided from the third optical system 93 to the light uniformizing element 30. The dichroic mirror 90 transmits the fluorescence from the fluorescent-body wheel 27 to the light uniformizing element 30. The excitation light B reflected by the dichroic mirror 90 is incident on the fluorescent-body wheel 27 through the second optical system 26.

Figure 23A:
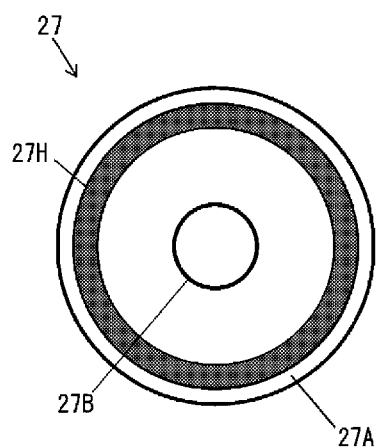
FIG. 23A illustrates a specific structure of a fluorescent-body wheel according to the fifth embodiment.
Figure 23B:
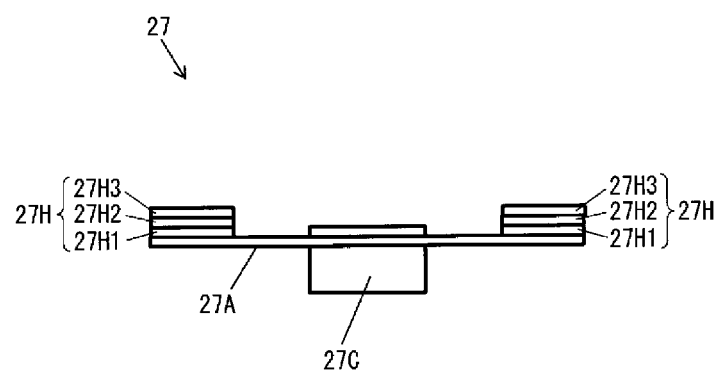
FIG. 23B illustrates the specific structure of the fluorescent-body wheel according to the fifth embodiment.

FIGS. 23A and 23B illustrate a specific structure of the fluorescent-body wheel 27 according to the fifth embodiment. The fluorescent-body wheel 27 of the fifth embodiment is not divided into the fluorescent region 27D and the excitation-light reflective region 27E in the circumferential direction unlike the first embodiment, and a fluorescent region (wavelength conversion region) 27H is provided entirely in the circumferential direction.

The fluorescent region 27H is constituted by layering a reflection coat 27H1, a fluorescent-body layer 27H2, and an anti-reflection coat (AR coat) 27H3 in this order from a lower-layer side toward an upper-layer side.

The reflection coat 27H1 has a characteristic of reflecting light in a wavelength region of the fluorescence (emission) by the fluorescent-body layer 27H2. When the disk member 27A is made of a metal substrate with high reflectivity, the reflection coat 27H1 may be omitted (the disk member 27A may have the function of the reflection coat 27H1).

The fluorescent-body layer 27H2 may use, for example, a substance in which a fluorescent-body material is dispersed into an organic or inorganic binder, a substance in which a crystal of a fluorescent-body material is directly formed, or a rare-earth fluorescent body such as a Ce:YAG-based substance. The wavelength band of the fluorescence (emission) by the fluorescent-body layer 27H2 may provide white light in combination with, for example, the blue laser beam emitted by each light source of the blue light source 91.

The anti-reflection coat 27H3 has a characteristic of preventing reflection of light at fluorescent-body layer 27H2.

The excitation light B incident on the fluorescent region 27H of the fluorescent-body wheel 27 is converted into fluorescence Y and is emitted. The fluorescence Y is turned into substantially parallel light by the second optical system 26, passes through the dichroic mirror 90, and is incident on the light uniformizing element 30. In contrast, the blue laser beam emitted by each light source of the blue light source 91 is turned into parallel light by the collimator lens 92, passes through the third optical system 93, is reflected by the dichroic mirror 90, and is incident on the light uniformizing element 30.

Sixth Embodiment

Figure 24:
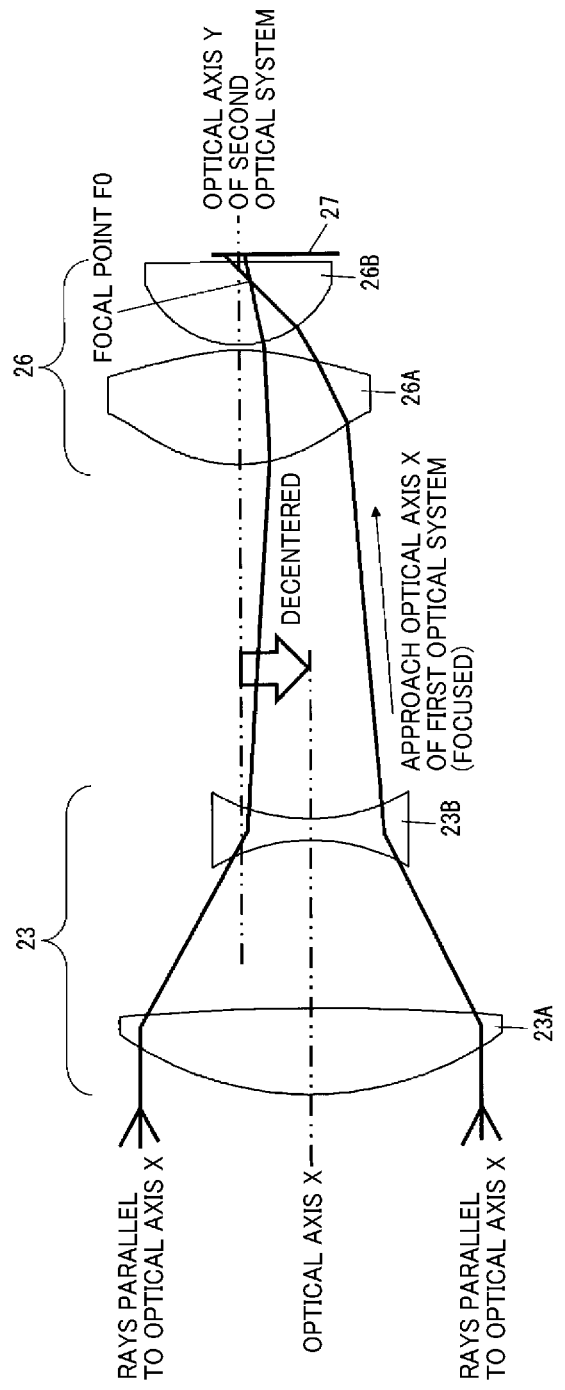
FIG. 24 illustrates an example of rays passing through a first optical system and a second optical system of a light source device according to a sixth embodiment.
Figure 25:
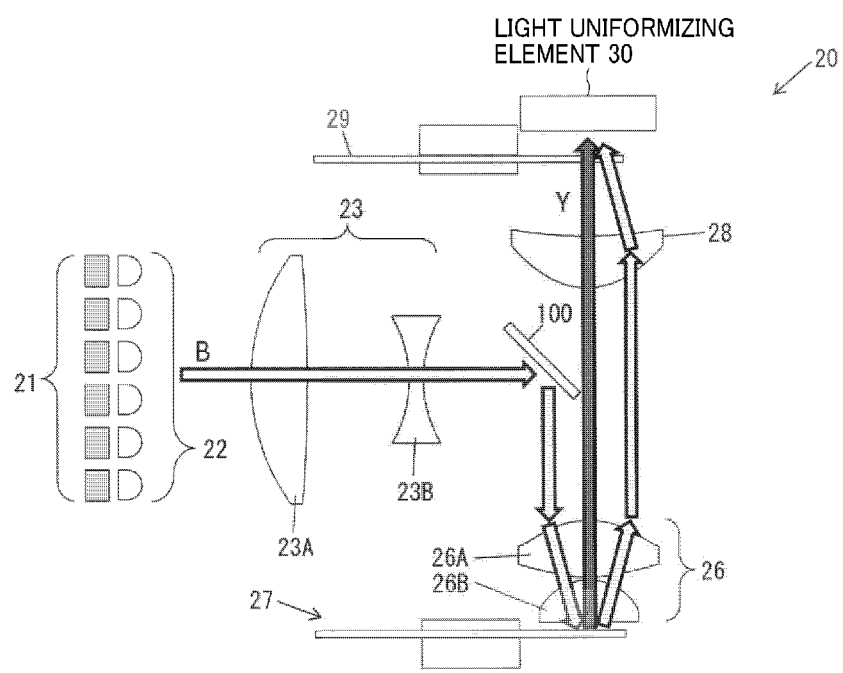
FIG. 25 schematically illustrates the light source device according to the sixth embodiment.

A projector 1 according to a sixth embodiment is described below in detail with reference to FIGS. 24 and 25. The same reference sign is applied to a configuration common to that of the first embodiment, and the redundant description is omitted.

In the sixth embodiment, the ¼ wave plate 25, which is arranged between the polarization beam splitter 24 and the second optical system 26 of the first embodiment, is omitted, and a dichroic mirror 100 is provided at the position at which the polarization beam splitter 24 is provided in the first embodiment. Furthermore, an optical axis X of the first optical system 23 and an optical axis Y of the second optical system 26 are decentered from each other in a direction perpendicular to the optical axes. Thus, excitation light B emitted from the first optical system 23 is incident on one side of the second optical system 26 (a lower side with respect to the optical axis Y in FIG. 24). In the sixth embodiment, light behaves similarly to the first embodiment when the optical axis X of the first optical system 23 is aligned with the optical axis Y of the second optical system 26.

While the polarization direction (S-polarized light, P-polarized light) is determined in the first embodiment, the polarization direction may be any direction in the sixth embodiment. The light emitted by the laser source 21 is turned into parallel light beams by the collimator lenses 22. Then, the parallel light beams pass through the first optical system 23, are reflected by the dichroic mirror 100 that reflects excitation light B and transmits fluorescence Y, and are guided to the second optical system 26. Since the first optical system 23 is arranged to be decentered from the second optical system 26, the excitation light B is incident on one side of the second optical system 26, and is obliquely incident on the fluorescent-body wheel 27. The excitation light B incident on the fluorescent region 27D of the fluorescent-body wheel 27 is converted into fluorescence Y, passes through an optical path similar to that of the first embodiment, and is guided to the light uniformizing element 30.

In contrast, the excitation light B incident on the excitation-light reflective region 27E of the fluorescent-body wheel 27 is regularly reflected. As illustrated in FIG. 25, the excitation light B passes through a side (right side in FIG. 25) opposite to a side (left side in FIG. 25) of the second optical system 26 on which the excitation light B is incident, and is emitted from the second optical system 26. The excitation light B emitted from the second optical system 26 is incident on the condenser lens 28 and is guided to the color wheel 29 and the light uniformizing element 30 without passing through the dichroic mirror 100.

While the excitation light B reflected by the excitation-light reflective region 27E of the fluorescent-body wheel 27 does not pass through the dichroic mirror 100 in the sixth embodiment, another dichroic mirror 100 may be alternatively used, the dichroic mirror 100 being increased in size and having a characteristic that a coat on a half surface reflects the excitation light B and transmits the fluorescence Y and a coat on the other half surface transmits the excitation light B and the fluorescence Y.

As described above, with the light source optical system, the light source device, and the projector (image projection apparatus) of any one of the embodiments, the first optical system 23 has an optical characteristic such that, when rays parallel to the optical axis A of the first optical system 23 are incident on the first optical system 23, rays emitted from the first optical system 23 are incident on the second optical system 26 while approaching the optical axis A. The second optical system 26 has under-corrected spherical aberration at the paraxial focal position of the second optical system 26. Thus, profiles on a fluorescent body of light beams emitted by respective light sources are uniformized, and landing positions (arrival positions) of light beams are made non-uniform, thereby increasing light utilization efficiency. Moreover, a uniformizing element, such as a diffusion plate or a microlens array, does not have to be used, thereby attaining decreases in size, complexity, and cost.

While specific examples desirable for the present invention are described in the above-described embodiments; however, the invention is not limited to the contents. In particular, the specific shapes and numerical values exemplified in the embodiments are merely example embodiments for implementing the invention. Therefore, the technical scope of the invention should not be limitedly interpreted. The present invention is not limited to the contents described in the embodiments, and may be properly modified within the gist of the invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority pursuant to 35 U.S.C. § 119(a) to Japanese Patent Application No. 2018-223215, filed on Nov. 29, 2018, in the Japan Patent Office, the entire disclosure of which is hereby incorporated by reference herein.

REFERENCE SIGNS LIST

1 Projector (image projection apparatus)
10 Housing
20 Light source device
21 Laser source (excitation light source)
22 Collimator lens (light source optical system)
23 First optical system (light source optical system)
23A Positive lens
23B Negative lens
24 Polarization beam splitter (light source optical system)
25 ¼ wave plate (light source optical system)
26 Second optical system (light source optical system)
26A Positive lens
26B Positive lens
27 Fluorescent-body wheel (light source optical system, wavelength conversion unit, fluorescent-body unit)
27A Disk member (substrate)
27B Rotation shaft
27C Driving motor (driving member)
27D Fluorescent region (wavelength conversion region)
27D1 Reflection coat
27D2 Fluorescent-body layer
27D3 Anti-reflection coat (AR coat)
27E Excitation-light reflective region
27E1 Reflection coat (reflecting surface)
27F Excitation-light transmissive region
27F1 Anti-reflection coat (AR coat, transmitting surface)
27G Fluorescent region (wavelength conversion region)
27G1 First reflection coat
27G2 Fluorescent-body layer
27G3 Second anti-reflection coat
27H Fluorescent region (wavelength conversion region)
27H1 Reflection coat
27H2 Fluorescent-body layer
27H3 Anti-reflection coat (AR coat)
28 Condenser lens (light source optical system)
29 Color wheel (light source optical system)
30 Light uniformizing element
40 Illumination optical system
50 Image forming element (image display element)
60 Projection optical system
70 Screen
80 Collimator lens
81 ¼ wave plate
82 Reflecting surface
90 Dichroic mirror (light source optical system)
91 Blue light source (light source optical system)
92 Collimator lens (light source optical system)
93 Third optical system (light source optical system)
100 Dichroic mirror

The invention claimed is:

1. A light source optical system used with an excitation light source configured to emit first color light, comprising:
   a wavelength converter to receive the first color light emitted by the excitation light source and emit second color light with a wavelength different from a wavelength of the first color light; and
   a first optical system having a positive power and a second optical system having a positive power provided in that order in an optical path between the excitation light source and the wavelength converter,
   wherein the first optical system has an optical characteristic such that, when a ray parallel to an optical axis of the first optical system is incident on the first optical system, a ray emitted from the first optical system is incident on the second optical system while approaching the optical axis, and
   wherein the second optical system has under-corrected spherical aberration at a paraxial focal position of the second optical system.

2. The light source optical system according to claim 1, wherein the second color light does not pass through the first optical system, and the second color light passes through the second optical system.

3. The light source optical system according to claim 1, wherein the first optical system and the second optical system are divided at a position in a maximum air gap.

4. The light source optical system according to claim 1, wherein the paraxial focal position by the second optical system is provided on a side opposite to the second optical system with reference to an incidence surface of the wavelength converter.

5. The light source optical system according to claim 4, wherein a focal position by the first optical system and the second optical system is on a side of the second optical system with reference to the incidence surface of the wavelength converter.

6. The light source optical system according to claim 4, wherein:
   when rays parallel to the optical axis are emitted from a number n of points O1, O2, ..., and On arranged within an outer diameter range of the first optical system on a side closest to the excitation light source at equal pitches in a direction orthogonal to the optical axis and away from the light source, and
   when a number n of intersection points P1, P2, ..., and Pn at which rays emitted from the second optical system intersect with the incidence surface of the wavelength converter are determined,
   a conditional expression (1) is satisfied as follows, $$Ln > L1 (n \text{ being an integer equal to or larger than 2}), \quad (1)$$

where L1 is a distance between the optical axis and the intersection point P1 corresponding to the point O1, and Ln is a distance between the intersection point Pn corresponding to the point On and an intersection point Pn−1 corresponding to a point On−1.

7. The light source optical system according to claim 4, wherein:
   when rays parallel to the optical axis are emitted from a number n of points O1, O2, ..., and On arranged within an outer diameter range of the first optical system on a side closest to the excitation light source at equal pitches in a direction orthogonal to the optical axis and away from the light source, and
   when a number n of intersection points P1, P2, ..., and Pn at which rays emitted from the second optical system intersect with the incidence surface of the wavelength converter are determined,
   the points O1, O2, ..., and On and the intersection points P1, P2, ..., and Pn corresponding to the points O1, O2, ..., and On are located on opposite sides with respect to the optical axis.

8. The light source optical system according to claim 1, wherein:
   a combined optical system including the first optical system and the second optical system has under-corrected curvature of field.

9. The light source optical system according to claim 1, wherein:
   the excitation light source includes a plurality of light sources and further includes a plurality of collimator lenses corresponding to the plurality of light sources, and
   when F1 denotes a focal point of a light beam emitted by a light source C1 closest to the optical axis and Fn denotes a focal point of a light beam emitted by a light source Cn farthest from the optical axis, the focal point Fn is located on a side of the first optical system with respect to the focal point F1.

10. The light source optical system according to claim 9, wherein, when Fn denotes a focal point of a light beam emitted by the light source Cn farthest from the optical axis, the focal point Fn is located between the first optical system and the second optical system.

11. The light source optical system according to claim 9, wherein, when Gn denotes a marginal ray closest to the optical axis among marginal rays of light beams emitted by the light source Cn farthest from the optical axis and Qn denotes an intersection point at which the marginal ray Gn intersects with an incidence surface of the wavelength converter, the light source Cn and the intersection point Qn are located on opposite sides with respect to the optical axis.

12. The light source optical system according to claim 1, wherein the first optical system includes a positive lens and a negative lens in this order from a side of the excitation light source toward a side of the wavelength converter and has under-corrected spherical aberration.

13. The light source optical system according to claim 1, wherein the second optical system includes at least two positive lenses, and at least one of the positive lenses has an aspherical surface.

14. The light source optical system according to claim 1, further comprising:
   a polarization beam splitter located in an optical path between the excitation light source and the second optical system,
   wherein the polarization beam splitter transmits one of a first polarization component and a second polarization component of the first color light and reflects the other one, and transmits or reflects the second color light.

15. The light source optical system according to claim 14, further comprising:
   a reflecting surface located on an emission side of the second optical system in an optical path of the first color light and configured to reflect the first color light.

16. The light source optical system according to claim 15, further comprising:
   a ¼ wave plate located in an optical path between the polarization beam splitter and the reflecting surface and provided for the first color light.

17. The light source optical system according to claim 1, further comprising:

a driver coupled to the wavelength converter and configured to be driven such that an irradiation position with the first color light on the wavelength converter moves over time.

18. A light source device, comprising:
an excitation light source; and
the light source optical system according to claim 1.

19. The light source device according to claim 18, wherein the excitation light source emits coherent light as the first color light.

20. An image projection apparatus comprising:
an excitation light source;
the light source optical system according to claim 1;
a modulator to modulate light from the light source optical system and form an image; and
a projection optical system configured to magnify and project the image onto a projection surface.

* * * * *